US011830303B2

(12) United States Patent
Boulais et al.

(10) Patent No.: US 11,830,303 B2
(45) Date of Patent: Nov. 28, 2023

(54) METHOD AND SYSTEM TO REMOTELY FLASH EXTERNAL MODULE USING A COMMUNICATION HUB

(71) Applicant: Automotive Data Solutions, Inc., Montreal (CA)

(72) Inventors: Sebastien Boulais, McMasterville (CA); Guillaume Verville, Terrebonne (CA); Mathieu Dinel, Sainte Sophie (CA); Martin Moreau, Montreal (CA)

(73) Assignee: Automotive Data Solutions, Inc., Montreal (CA)

( * ) Notice: Subject to any disclaimer, the term of this patent is extended or adjusted under 35 U.S.C. 154(b) by 107 days.

(21) Appl. No.: 17/509,414

(22) Filed: Oct. 25, 2021

(65) Prior Publication Data
US 2022/0130191 A1    Apr. 28, 2022

Related U.S. Application Data

(60) Provisional application No. 63/106,757, filed on Oct. 28, 2020.

(51) Int. Cl.
*G07C 9/00* (2020.01)
*B60R 25/24* (2013.01)
*H04L 9/08* (2006.01)

(52) U.S. Cl.
CPC .......... *G07C 9/00309* (2013.01); *B60R 25/24* (2013.01); *H04L 9/0891* (2013.01); *G07C 2009/00769* (2013.01); *G07C 2009/00865* (2013.01)

(58) Field of Classification Search
CPC ...... G07C 9/00309; G07C 2009/00769; G07C 2009/00865; B60R 25/24; H04L 9/0891
See application file for complete search history.

(56) References Cited

U.S. PATENT DOCUMENTS

| 9,075,686 | B2* | 7/2015 | Alrabady | G06F 8/65 |
| 10,940,830 | B2* | 3/2021 | Stanfield | B60R 25/241 |
| 2011/0291797 | A1* | 12/2011 | Tessier | G07C 9/00309 340/5.61 |
| 2013/0139149 | A1* | 5/2013 | Boulais | G06F 8/654 717/178 |
| 2016/0001741 | A1* | 1/2016 | Fazi | B60R 25/209 701/2 |
| 2016/0098870 | A1* | 4/2016 | Bergerhoff | H04W 4/48 340/5.61 |

* cited by examiner

*Primary Examiner* — Thomas D Alunkal
(74) *Attorney, Agent, or Firm* — Trojan Law Offices

(57) ABSTRACT

A system to remotely flash an external module, the system comprising an external module installable in a secured location having at least one securing device with a transponder, at least one server, wherein the at least one server and a communication hub that communicates said at least one server, said communication hub further comprising a communication device that extracts key data from the securing device's transponder. Additional embodiments of the system include an external module and a learning module that extract partial key data. A method to flash the external module by extracting at least one set of partial key data from the securing device's transponder and/or securing device using an external module, communication device, and/or learning module, wherein the server analyzes and processes the set(s) of partial key data to generate a securing device bypass for the external module that installed to the secured location.

11 Claims, 41 Drawing Sheets

METHOD AND SYSTEM TO REMOTELY FLASH EXTERNAL MODULE USING A COMMUNICATION HUB

STATEMENT OF PRIORITY

This application claims priority to U.S. Provisional Application No. 63/106,757 filed on Oct. 28, 2020.

FIELD OF THE INVENTION

The present invention relates method and system to remotely flash an external module. In particular, the present invention relates to method and system to remotely flash an external module using a communication hub to collect key data from a security system.

BACKGROUND OF THE INVENTION

Within the last two decades, many innovations and technologies have been developed to reduce the likelihood of a vehicle getting stolen.

As an example, securing devices, such as immobilizers, have been added to cars, such device allowing a vehicle to start only if a chip is present within a certain range of the vehicle. Such securing devices usually make use of transponder systems that require the presence of a RFID transponder within a certain range for the engine to run or the door to be unlocked.

For example, FIG. 14 depicts a typical securing device. In FIG. 14, the engine control module 302 is responsible for engine management. When a user attempts to start the engine, the engine control module 302 will communicate with the securing device 301. The securing device 301 may be a vehicle immobilizer system comprised of an immobilizer module 3000, a data to RFID module 3001, and a RFID antenna 3002. The immobilizer module 300 also has a communication link 3007 with the data to RFID module 3001. RFID module 3001 has a communication link 3008 to the RFID antenna 3002. RFID antenna 3002 has a communication link 3009 with the vehicle key 40. These communication links maybe wired or wireless in nature.

In some instances, the securing device 301 is also responsible for authenticating a vehicle key 40 before a vehicle's engine can start by confirming key data 3003 (which is the key data residing inside vehicle key 40 in internal memory 4000 and/or immobilizer module 3000 in internal memory 3010). To do so, the RFID antenna 3002 reads the key data 3003 from the vehicle key 40, sends the data to the RFID transceiver module 3001, which sends the data to the immobilizer module 3000. If the key data 3003 is not confirmed, the engine will not start.

These new technologies have significantly increased the security of a car to the detriment of the manufacturers of remote starter apparatuses. Consequently, in order to allow a remote starter to work, a bypass module must be installed within the car. The bypass module uses any communication method in order to request the starting of the engine of the car. However, the new technologies, such as the transponder, requires a key having a RFID or at least a transponder chip comprising a RF loop to be present within the car.

This solution provides the advantage of allowing an external module such as a remote starter apparatus to work seamlessly for the user. However, the solution also reduces the security level of the car since the key or chip with RF loop could be used by a potential thief to start the engine once the thief breaks into the car.

Thus, systems and methods were developed to allow an external module to request the start of the engine of a vehicle without decreasing the security for the owner of the car.

Prior methods to remotely flash an external module generally comprise the steps of electronically transferring a computer program, such as a firmware or a software, from a computer device to an external module, installing the external module to a vehicle, collecting the key data from a device securing the vehicle using a computer program, transferring the key data to a computer, analyzing and process the key data with a computer program and thereby generating a new computer program allowing the external module to communicate with the securing device and to transfer the generated computer program to the external module.

To accomplish the above, prior systems are generally comprised of an external module, a secured physical location (such as a vehicle with a securing device), a computer, a computer program, a data source, a communication method between the external module and the physical location securing device and a communication method between the external module and the computer such as a USB cable to UART converter cable.

For example, the method shown in FIG. 15 utilizes a data immobilizer bypass interface or external module 30 that is connected to the securing device 301 by using the connection between the immobilizer module 3000 and the data to RFID transceiver module 3001.

This configuration allows the data immobilizer bypass interface or external module 30 to observe communication exchange between the immobilizer module 3000 and the vehicle key 40, communicate with vehicle key 40 or immobilizer module 3000, and collect a key data reading 3004 from the vehicle key 40. The collection process may involve a computer and/or external server.

After the collection is complete, the external module 30 is capable of emulating the vehicle key and the securing device 301 can be overcome even without the presence of the actual vehicle key 40.

A critical drawback to the prior systems and methods to remotely flash an external module is where the security system has two sets of key data, one from the vehicle immobilizer itself and one set of key data in the vehicle key transponder. The newer systems and methods may prevent an external module from starting the vehicle simply by collecting the information from one source (e.g., vehicle immobilizer), but may also require information a second source (e.g., vehicle remote). Existing systems and methods to remotely flash an external module do not possess the capability of collecting information from these two sources.

A second drawback to the prior systems and methods to remotely flash an external module are limitations inherent to the communication method between the external module and the physical location securing device and the limitations in the communication method between the external module and the computer. Prior systems simply use a USB cable to UART converter cable, which is simply a passthrough for information. The communication method itself lacks the capability to be programmed to assist in the remote flashing process.

A third drawback to the prior systems and methods to remotely flash an external module are limitations in external module. Due to the size and expense of producing the external module, its hardware features are currently limited to collecting the key data from a device securing the vehicle using a computer program and transferring key data readings to a computer.

A fourth drawback to the prior systems and methods to remotely flash an external module are physical limitations in the communication method between the external module and the securing device (e.g. vehicle immobilizer) and the limitations in the communication method between the external module and the computer An example of this limitation is presented when dealing with different operating systems of the computer used in the remote flashing process. In situations where the computer uses different operating systems such as Apple and Android operating systems, different types of hardware cables will be required for the flashing process.

As another example, the USB cable to UART converter cable that is typically used also has physical constraints such as the length of the cable and the specifics needs of the physical connection, such as a USB port or UART port. Thus, there is a need to utilize a wireless communication method to bypass physical limitations such as cable length and physical input requirements.

It is the object of the invention to provide a system and method to remotely flash an external module that can collect information from a securing device (e.g., vehicle immobilizer system) and from a transponder linked to the securing device (e.g., vehicle remote).

It is the object of the invention to provide a system and method to remotely flash an external module that can collect information from a securing device (e.g., vehicle immobilizer system) and from a transponder linked to the securing device (e.g., vehicle remote) with a device that can collect information from the vehicle remote (e.g., key data readings) that can be provided directly to external module installers.

It is the object of the invention to provide a system and method to remotely flash an external module utilizes a communication method between the external module and the physical location securing device and a communication method between the external module and the computer that can execute programming instructions.

It is the object of the invention to provide a system and method to remotely flash an external module utilizes a wireless communication method between the external module and the physical location securing device and wireless communication method between the external module and the computer

SUMMARY OF THE INVENTION

A method to remotely flash an external module generally comprises the steps to electronically transfer a computer program, such as a firmware or a software, from a computer device to an external module, to install the external module to a vehicle, to collect the key data from a device securing the vehicle using a computer program, to transfer the key data to a computer, to analyze and process the key data with a computer program, collect key data from a transponder paired to the device securing the vehicle using a computer program, to transfer the key data to a computer, to analyze and process the key data to generate a securing device bypass allowing the external module to communicate with the securing device and to transfer the generated securing device bypass to the external module.

The system to remotely flash an external module comprises an external module, a physical location with a securing device and a transponder, a computer, a computer program, a data source, a communication method between the external module and the securing device, a communication method between the external module and the securing device's transponder, and a communication method between the external module and the computer.

The communication method between the external module and the securing device and the communication method between the external module and the securing device's transponder is comprised of a communication hub that has microcontrollers with software and a transponder port that can be used to collect readings associated with the key data on the vehicle transponder. The communication hub can also communicate with both the external module and the computer, and in future iterations, the communication hub can act as a replacement for the computer and server. The software for the microcontrollers may be updated with additional software to modify or add functions to the communication hub over time.

One of the advantages of implementing the communication hub is the reduction of the production cost of an external module for vehicles that require an additional key data reading from the vehicle transponder as part of the remote flashing process. For example, prior remote flashing systems and methods that require an additional key reading from the vehicle transponder integrated additional hardware into the external module. That way, the external module could collect an additional key data reading from the vehicle transponder in addition to key data readings from the vehicle immobilizer. However, incorporating additional hardware into the external module would escalate the production cost such that the external module may no longer be affordable to consumers.

To address issues cost issues associated with the new security features, the use of a communication hub allows a manufacturer avoid adding more hardware to the external module. The functionality of performing an additional key data reading on the vehicle transponder can instead be included in a communication hub, which does not need to be provided to the consumer for at least the reasons discussed below.

First, most external modules are professionally installed by installation experts (and not the individual consumer) due to the complexity of the process. Thus, only professional module installers necessarily need access to the communication hub when installing and remotely flashing external modules.

Second, since the additional key data reading is only normally performed once during the remote flashing process, integrating the vehicle transponder reading hardware into the communication hub instead of the external module will mean the technology will not be wasted after the installation is complete. The external module does not need the transponder key reader for the external module to function after it has been remotely flashed.

Based on the foregoing, using the communication hub also allows manufacturers to incorporate additional functionality into the remote flashing process without needing to modify the hardware or functionality of the external module. This allows the external module to be continually compatible with the advancing technology of securing devices such as vehicle immobilizers.

DETAILED DESCRIPTION OF THE SYSTEM

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and to fully convey the scope of the invention to those skilled in the art.

Figure 1:
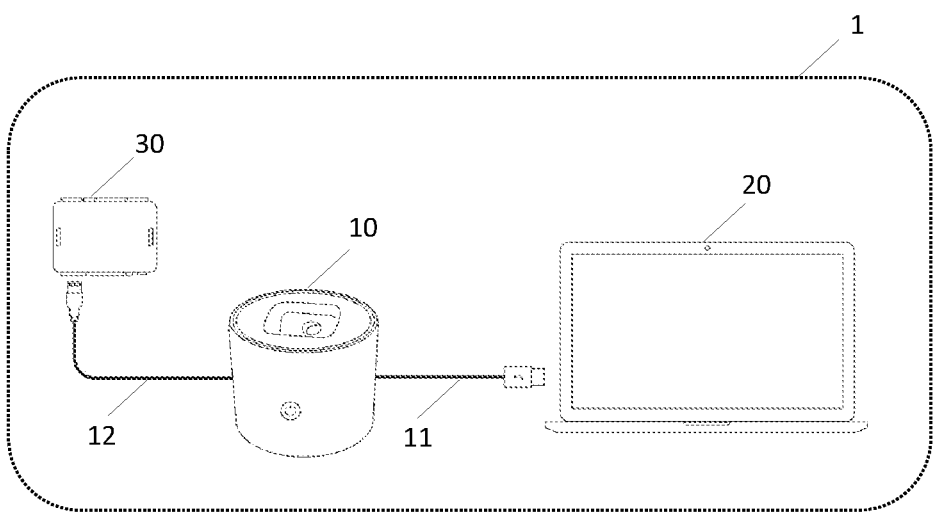
FIG. 1 depicts the system to remotely flash an external module with a communication hub in accordance with an embodiment of the present invention.

FIG. 1 depicts the system 1 to remotely flash an external module. The system 1 is comprised of an external module 30, a computer 20, and a communication hub 10 that serves as a means of communication between the computer 20 and the external module 30.

Figure 2:
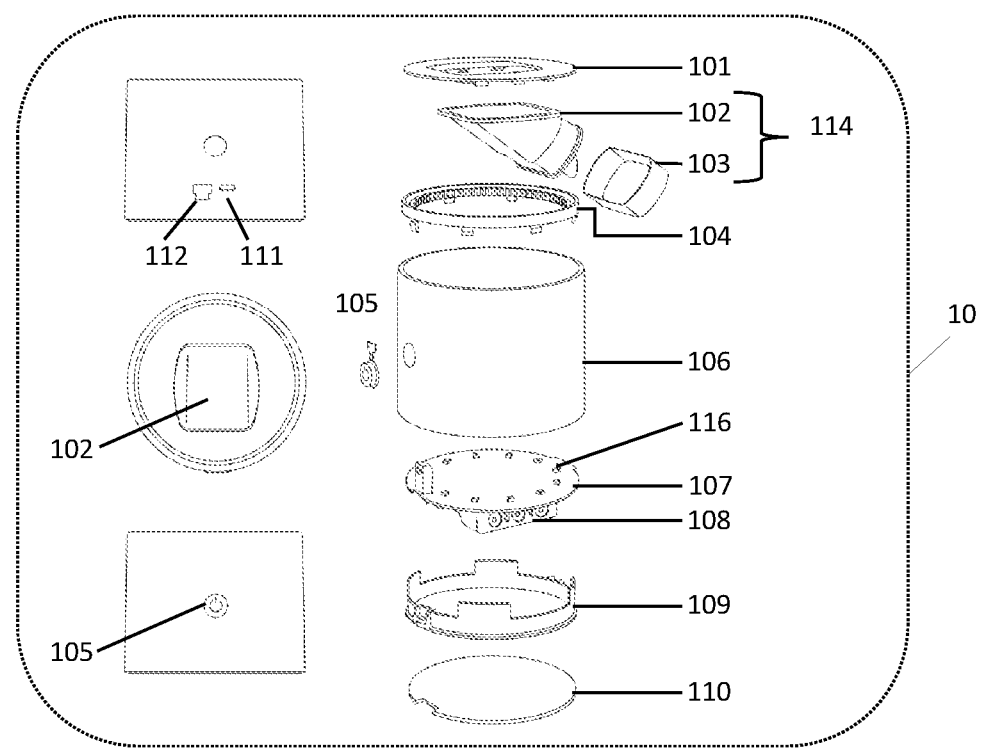
FIG. 2 depicts the components comprising the communication hub in accordance with an embodiment of the present invention.

FIG. 2 depicts a communication hub 10. The communication hub 10 is comprised of a top cover 101, a holder 102, a coil 103, a lens 104, an input button 105, a housing 106, a printed circuit board 107, a battery 108, a battery cover 109, and a housing closure 110.

The top cover 101, housing 106, battery cover 109, and housing closure 110 form the general outer structure of the communication hub 10.

Figure 3:
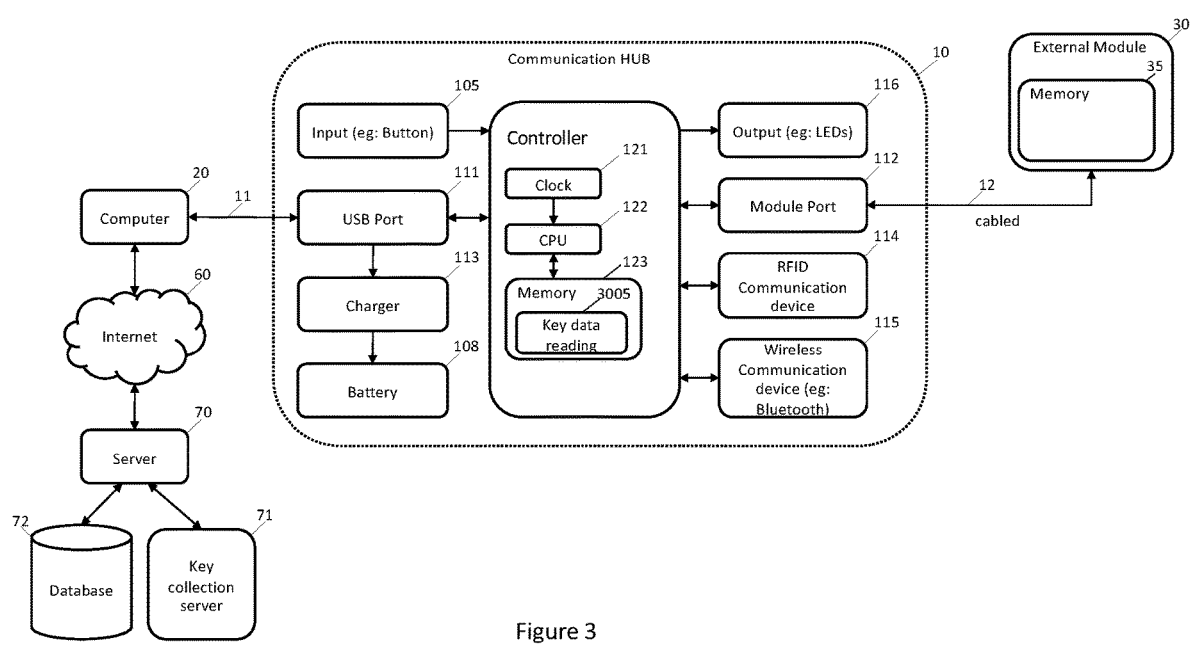
FIG. 3 depicts a schematic illustrating the function of the communication hub in accordance with an embodiment of the present invention.

As shown in FIGS. 2 and 3, the printed circuit board 109 is comprised of controller 120, which in turn is comprised of a clock 121, a central processing unit ("CPU") 122, and memory 123.

Also as shown in FIG. 3, the communication hub is further comprised of communication means including physical ports and devices such as a USB Port 111, a module port 112, a Radio Frequency Identification ("RFID") Communication Device 114, and a wireless communication device 115 (e.g., Bluetooth.)

Figure 12:
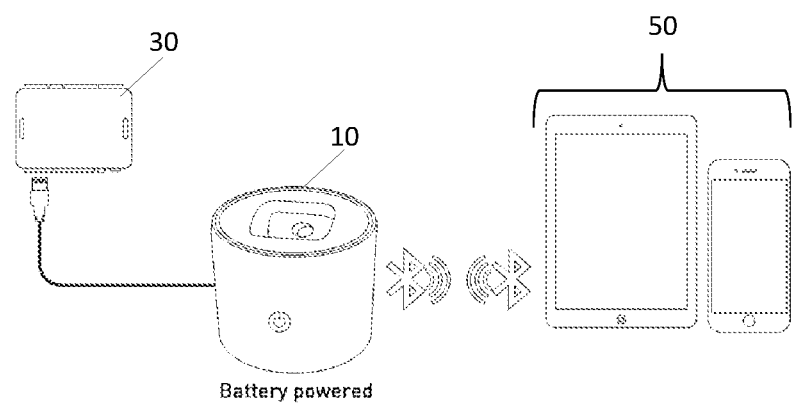
FIG. 12 depicts the system to remotely flash an external module with a communication hub communicating wirelessly with a mobile device in accordance with an embodiment of the present invention.

More particularly as shown in in FIG. 12, the wireless communication device 115 of communication hub 10 allows the communication hub 10 to interconnect the external module 30 with a computer 20 (the computer 20 of this particular system and for all subsequent systems may be substituted for a mobile device 50 or any other equivalent computing device known in the art) for the remote flashing configuration process without the use of a wired connection. This configuration addresses the concern where different cables would be required for Apple operating systems and one for Android operating systems, thus, making the interconnection universal to any device that is compatible with the wires communication device 115.

Figure 13:
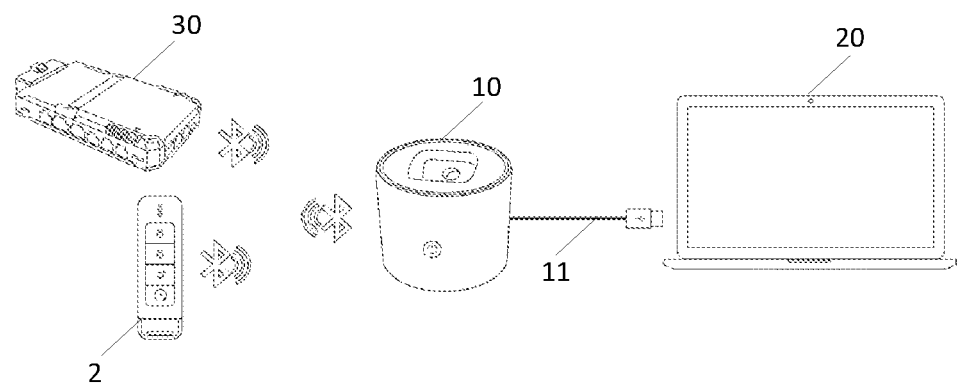
FIG. 13 depicts the system to remotely flash an external module with a communication hub communicating wirelessly with an external module and a remote control for the external module in accordance with an embodiment of the present invention.

Additionally, as shown in FIG. 13, the when the communication hub 10 is connected to a computer 20, the wireless communication device 115 allows a computer 20 (that may not have a wireless communication means such as Bluetooth), to communicate wirelessly with an external module 30 or a remote 2 for the external module 30 and remotely flash, program, or configure a remote 2.

The RFID communication device 114 is comprised of holder 102 and a coil 103 that is used to acquire key data on the vehicle transponder.

The communication hub 10 is further comprised of an input button 105 for powering on and off the communication hub 10 so as not to drain power from the battery 108 when the communication hub 10 is idle. One skilled in the art can also assign other features to the input button 105 such as starting applications on the connected computer 20 or mobile device 50, activate Bluetooth pairing or other functions. The communication hub 10 also has output light emitting diodes ("LEDs") 116 to communicate the status of the communication hub 10 with the user through visual signals and cues.

Additionally, in a preferred embodiment, a charger 113 may be connected to the USB Port 111 and the battery 108 to provide electricity to the battery 108 when needed. Other embodiments may allow the charger to be connected directly to a vehicle battery or another external power source.

In one particular embodiment of the invention, the communication hub 10 is connected a computer 20 using a connection 11 to USB port 111. The communication hub 10 is also connected to an external module 30 with a connection 12 to the module port 112.

The computer 20 is connected to the internet 60, which in turn facilitates the connection to the server 70 to allow the external module 30 to be remotely flashed.

Figure 14:
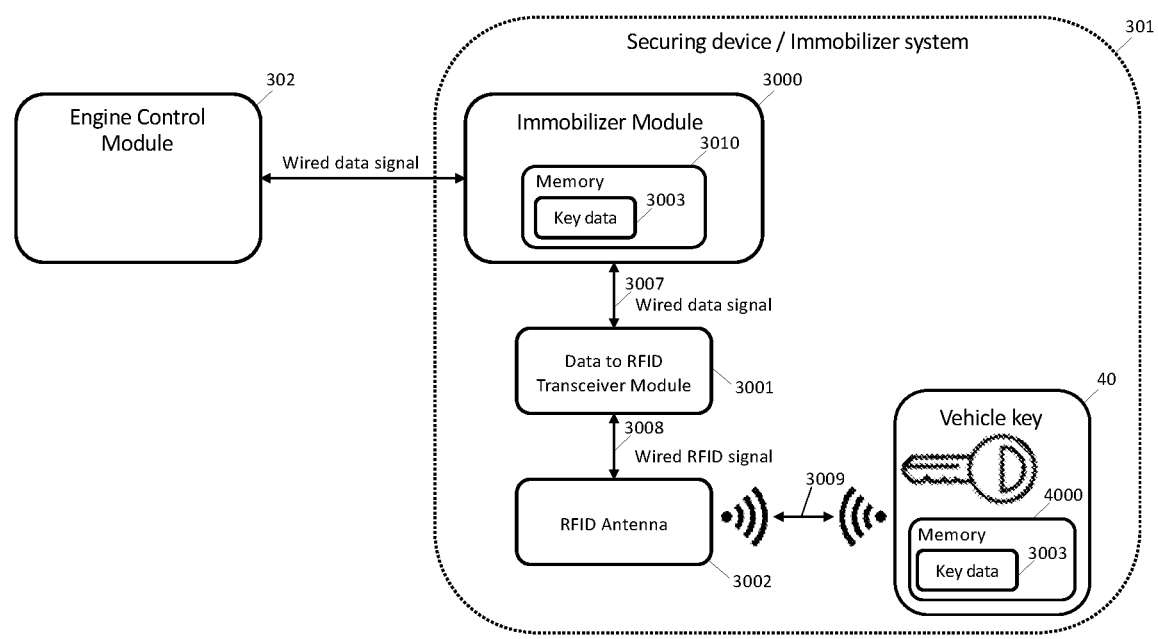
FIG. 14 depicts a schematic the components of a vehicle immobilizer.
Figure 15:
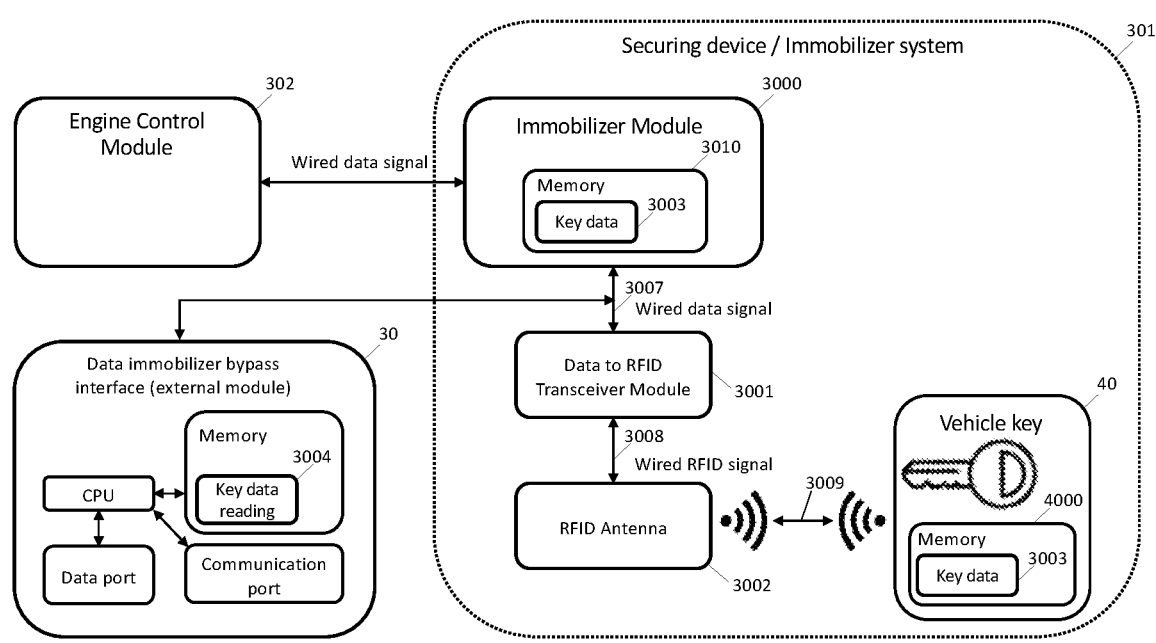
FIG. 15 depicts a schematic showing the component used to bypass a vehicle immobilizer with an embodiment of the present invention.

Now referring to FIG. 1, FIG. 3, and FIG. 14, a system 1 to remotely flash an external module 30 is shown. The system 1 comprises an external module 30 installable in a vehicle 3 having securing devices 301 and 302, a computer 20, a computer program 400 such as a firmware or any portable software, configured to be compatible with the external module 30, a data source 72, a communication method between the external module and the securing device 301 (as shown in in FIG. 14), a communication hub 10, a web server 70, a key collection server 71, and a communication network 60 such as Internet, LAN or WAN between the computer 20 and the web server 70.

The external module 30 comprises at least one communication port and at least one rewritable memory unit. In the alternative, the external module 30 may have a RFID port or a data port. Additionally, the external module may comprise a clock, CPU (such as a microprocessor or any microchip) allowing the execution of a computer program 400.

In the present embodiment, a web application is executed on a server 70. The server 70 communicates the received key data readings 3004, 3005, 3006 to the key collection server 71.

Key data reading 3004 is collected from the immobilizer system 301 and stored inside the external module's 30 internal memory 35.

Key data reading 3005 is collected from vehicle key 40 and stored inside the communication hub's 10 internal memory 123.

Key data reading 3006 is collected from immobilizer system 301 and stored inside the learning module's 80 internal memory 81.

Further, a computer 20 comprises at least one memory unit device, at least one microprocessor and at least one I/O device such as network card and communication port, such as USB, RS-232, TCP/IP, wireless, Firewire™ port, or Bluetooth connection. The computer 20 accesses the web server 70 through a communication method 60, such as an Internet protocol, a web-service or any remote call procedure. The computer 20 may be configured to access a reference table or data source 72 of computer programs 400 per car model or manufacturer. The web server 70 is compiled and configured to access and fetch the database based on input parameters such as manufacturer, model or physical location securing device model.

The key collection server 71 is configured to extrapolate the key data 3003 from the key data readings 3004, 3005, 3006 to generate a securing device bypass 500, such as a computer program, to be transferred to the external module 30 Additionally, the key collection server 71 is configured to generate a securing device bypass 500 based on the information retrieved from the data source 72. Such generated securing device bypass 500 allows the bypass of the securing devices 301 and 302 on a request to remotely start the vehicle or bypass the securing devices.

The securing device 301 may be embodied as a car anti-theft apparatus or a physical location alarm system, or a digitally secured space.

The data source 72, such as a relational database, a precompiled table, one or more graphic card having a graphical processor unit, an array of FPGA, any cloud-based data source or an XML file, is structured to store the data required to generate the securing device bypass and may make use of indexation information such as the manufacturer, the model and the specifications of the model to optimize the performance of the data source 72.

The communication hub 10 connecting the external module 30 and the computer 20 facilitates the transfer of data from and to the external module 30. The transfer of the data may comprise the methods to upload the key data readings 3004, 3005, 3006 to the server 70 or the transfer of the computer program 400 or securing device bypass 500 from the computer 20 to the external module 30.

The communication method between the external module 30 and the securing device 301 can be a physical cable or a wireless signal (e.g., Bluetooth).

In another embodiment, the computer 20 may have a direct access to the database 72 or may manually fetch and retrieve the computer program 400 using a portable medium such as CDROM, USB stick or any portable storage device without requiring an access to a communication network 60. For example, one may communicate the key data reading 3004 or the external module 30 itself to a third party using any communication method, such as email, mail or courier. The third party receiving the key data reading 3004 or external module 30 would then generate a securing device bypass 500 using a key collection server 71 and return the securing device bypass 500 to the external module 30 using the same or a different communication method.

In another embodiment, the web server 70, key collection server 71, the computer 20 and the data source 72 may installed or located on the same physical machine or on a plurality of physical machines.

In another preferred embodiment, the system 1 may include a learning module 80. The learning module 80 is a portable device that can be temporarily installed in the vehicle to collect key data readings 3006 on the securing device 301. Readings can be done methods known in the art thru OBDII, data lines, RFID lines or wireless RFID.

Additionally, the learning module 80 can be externally controlled by a computer 20, mobile device 50, server 70, or be autonomous as an independent unit. The learning module 80 can collect key data readings 3006 with or without external input such as: (1) user input (e.g., a button), (2) software on a computer 20; (3) parameter(s) coining from server 70 or 71. The learning module 80 may also utilize key readings from the other components such as 3004 and 3005.

The learning module 80 may be capable of communicating the collected key data readings 3004, 3005, or 3006 to a computer 20, a communication hub 10, an external module 30 or directly to a server 70 or key collection server 71. The learning module 80 can be a universal device with many capabilities or can be a plurality of different learning modules and each one could be used for a specific capability depending on the selected vehicle by one skilled in the art.

Figure 31:
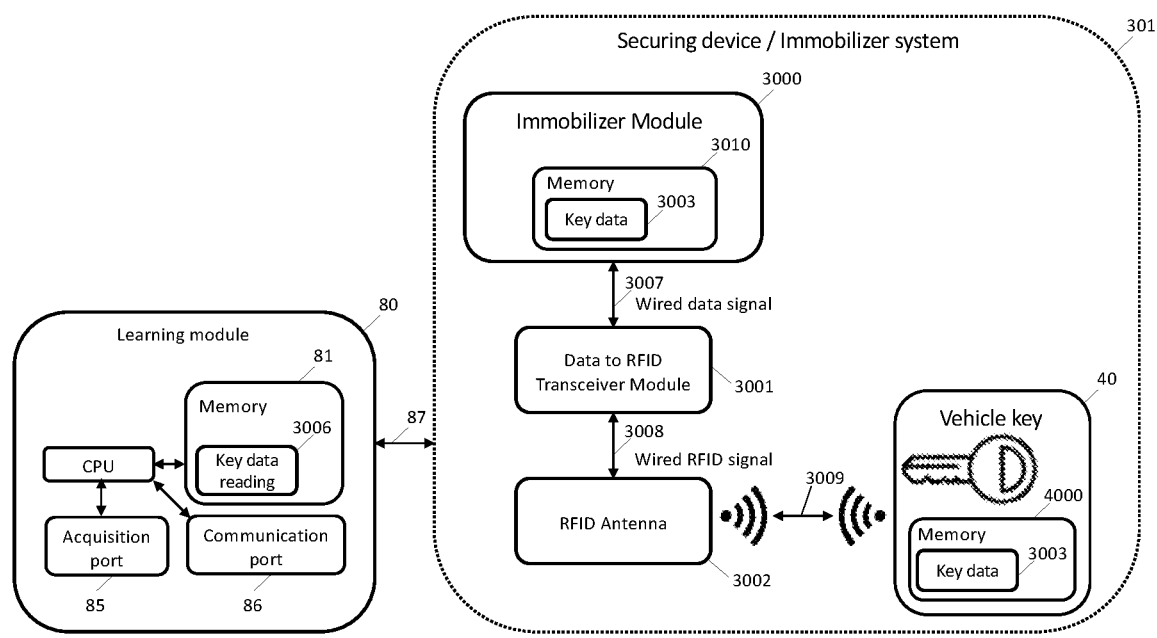
FIG. 31 depicts a schematic showing the components to bypass a vehicle immobilizer with a learning module in accordance with an embodiment of the present invention.

As shown in in FIG. 31, The learning module 80 is comprised of a CPU, an acquisition port 85 (to collect key data readings from the immobilizer system 301), memory 81, and a communication port 86 (used to communicate with communication hub 10, computer 20, external module 30, mobile device 50, or any equivalent computing device). The learning module may be connected to the securing device 301 through connection 87. The learning module is also designed to collect key data reading 3006, which is stored in memory 81.

Figure 32:
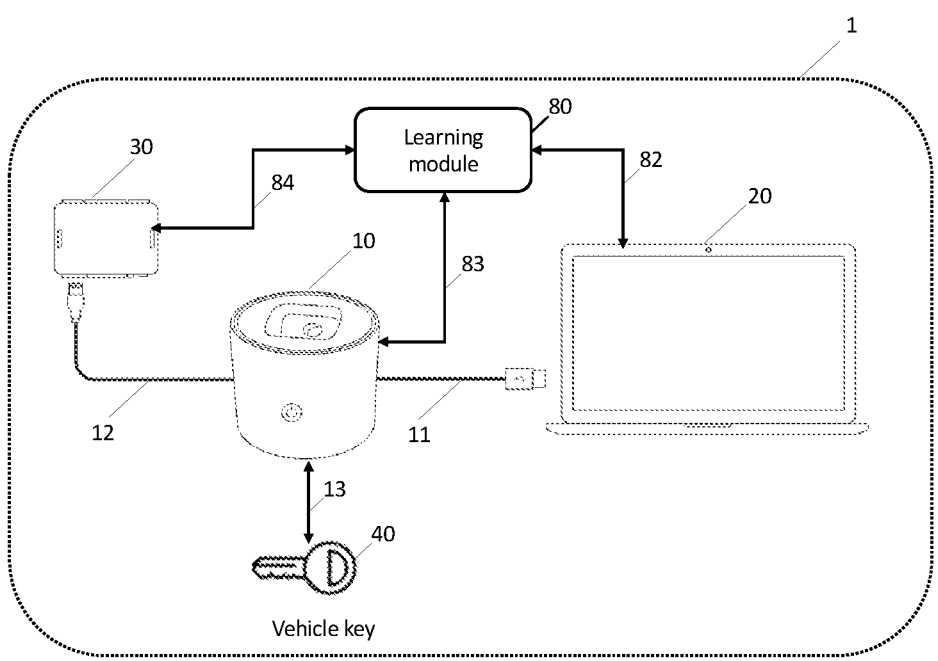
FIG. 32 depicts the system to remotely flash an external module with a communication hub and learning module in accordance with an embodiment of the present invention.

In addition to the system 1 described in FIG. 1, FIG. 32 depicts how the learning module may be connected to the other components of the system 1. The learning module 80 is connected to: (1) the computer 20, mobile device 50, or any equivalent computing device through connection 82; (2) the communication hub 10 through connection 83; and (3) the external module 30 through connection 84. These connections may utilize any wired, wireless, or internet protocol that are known in the art.

Figure 33:
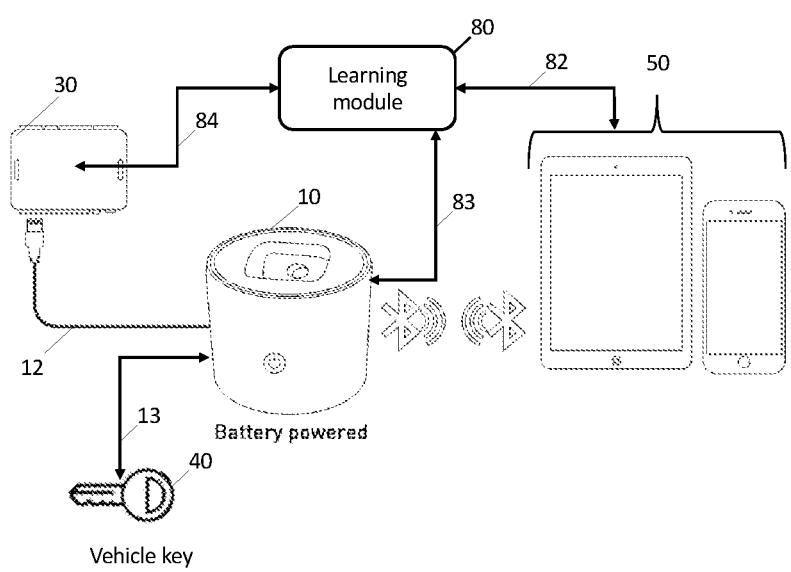
FIG. 33 depicts the system to remotely flash an external module with a communication hub and learning module in accordance with an embodiment of the present invention.

As another example, FIG. 33 shows the learning module connected in the system previously depicted in FIG. 12 utilizing a mobile device 50 and a Bluetooth connection.

Figure 4:
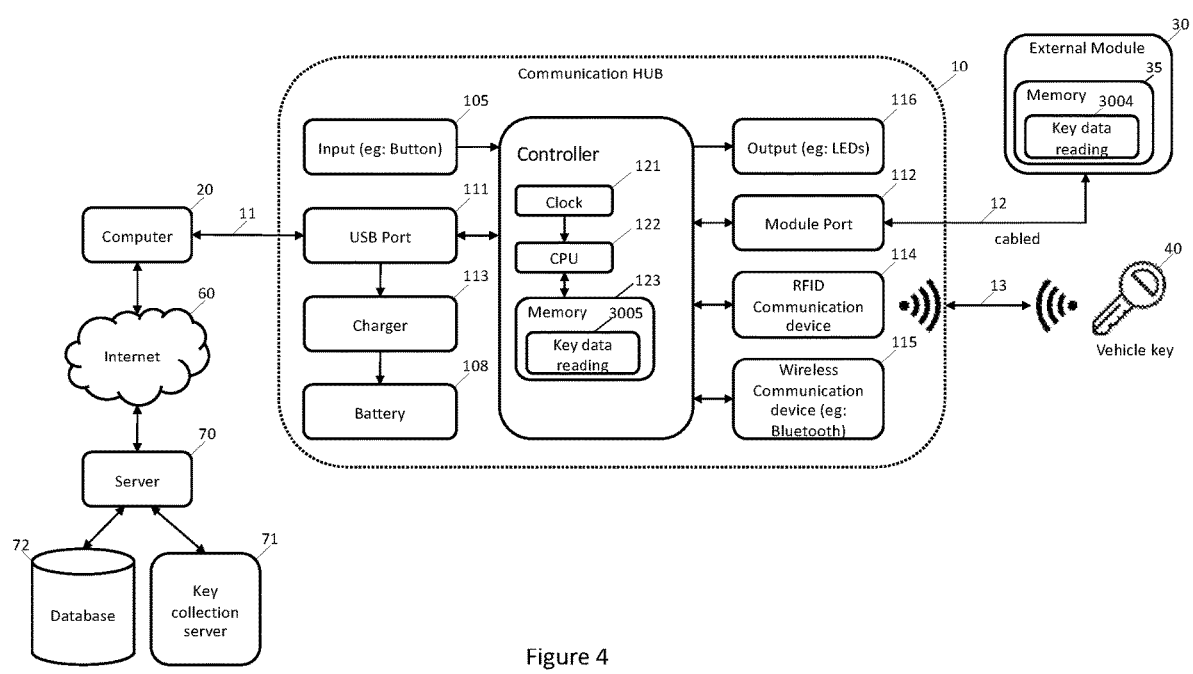
FIG. 4 depicts a schematic illustrating the function of the communication hub in accordance with an embodiment of the present invention.

Now referring to FIG. 4, which is another embodiment of the system to remotely flash an external module 30. In this embodiment, key data on the securing device's transponder (e.g., vehicle key) 40 is required to complete the remote flashing of the external module 30. The communication hub 10 in this embodiment is used to interconnect the external module 30 with the computer 20 for the remote flashing configuration. The communication hub 10 is connected to the external module 30 using the module port 112 and a communication means 12, which can be wired or wireless communication means.

The communication hub 10 is also used by the computer 20 to collect key data reading 3005 from the securing device's transponder, such as a vehicle key 40. The communication hub 10 connects to the securing device's transponder 40 by using the RIFD communication device 114 and a communication means 13, which is a wireless communication protocol in the preferred embodiment. In other embodiments communications means 13 may be a wired communication protocol. When collected, the key data reading 3005 is sent to server 70 to extrapolate key data 3003 to produce a vehicle specific securing device bypass 500.

Figure 5:
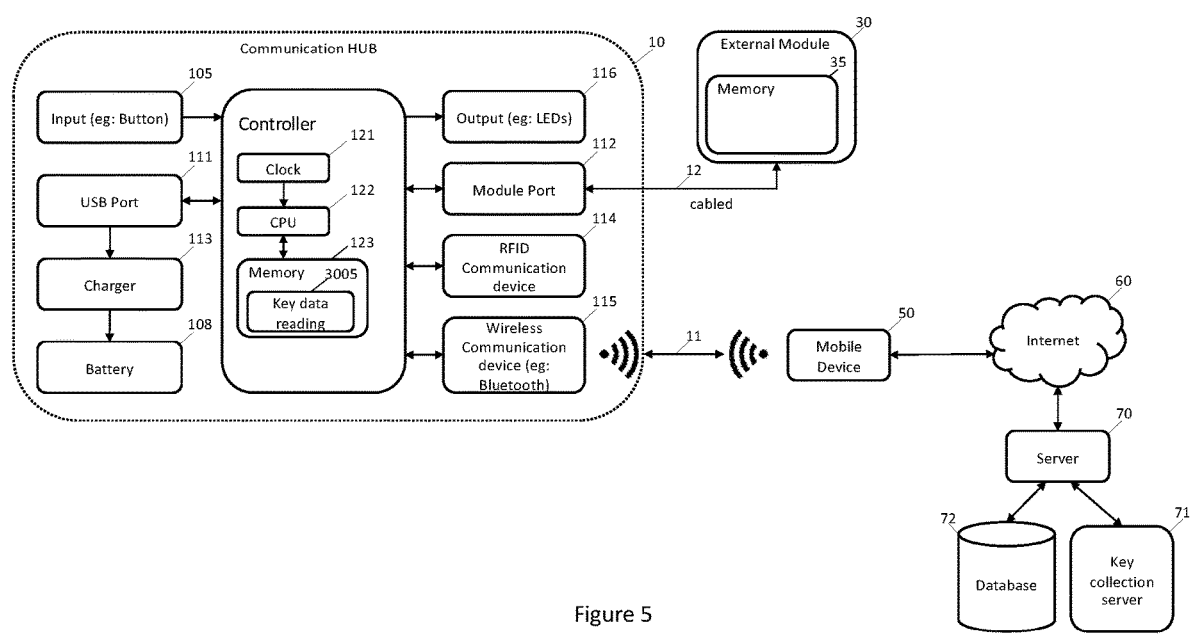
FIG. 5 depicts a schematic illustrating the function of the communication hub in accordance with an embodiment of the present invention.

Now referring to FIG. 5, which is another embodiment of the system to remotely flash an external module 30. In this embodiment, the computer 20 is substituted for a mobile device 50 (e.g., a smartphone or tablet), which comprises at least one memory unit device, at least one microprocessor and at least one I/O device such as network card and communication port, such as USB, RS-232, TCP/IP, wireless, Firewire™ port, or Bluetooth connection. The mobile device 50 uses a communication means 11 to connect to the communication hub 10, which can be a wired or wireless communication means.

Additionally, the mobile device 50 accesses the server 70 through a communication method 60, such as an Internet protocol, a web-service or any remote call procedure. The mobile device 50 may be configured to access a reference table or data source 72 of computer programs 400 per car model or manufacturer. The server 70 is compiled and configured to access and fetch the database based on input parameters such as manufacturer, model or physical location securing device model. The key collection server 71 is configured to generate securing device bypass 500 based on the information retrieved from the data source 72. Such generated securing device bypass 500 allows the bypass of the securing devices 301 and 302 based on a request from a user.

Figure 6:
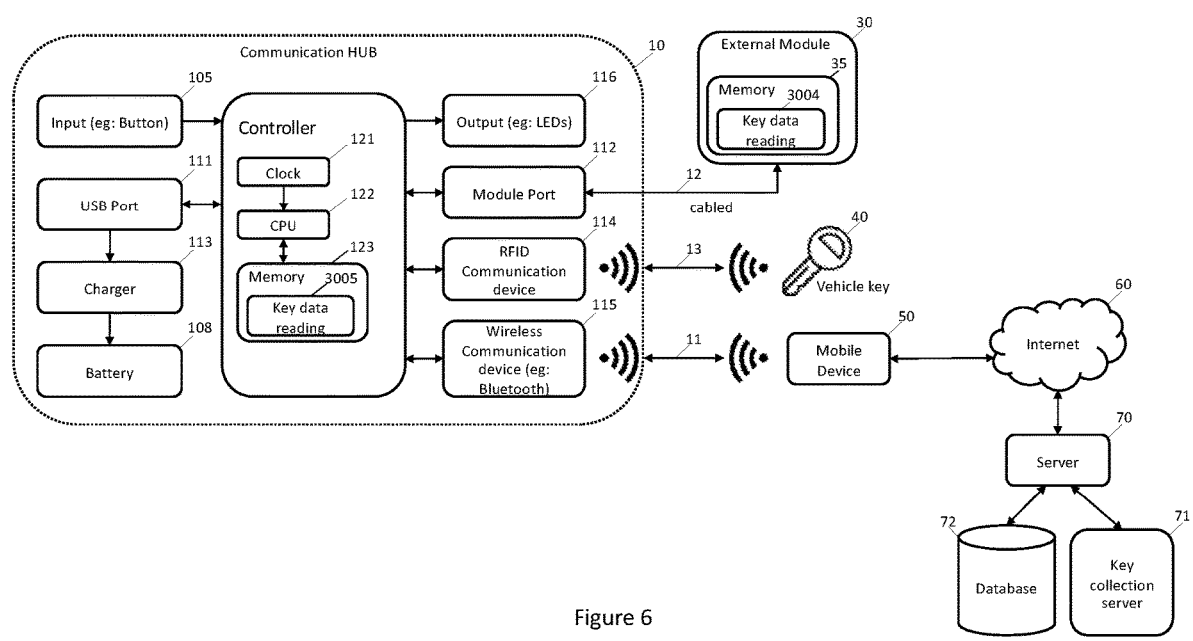
FIG. 6 depicts a schematic illustrating the function of the communication hub in accordance with an embodiment of the present invention.

Now referring to FIG. 6, which is another embodiment of the system to remotely flash an external module 30. In this embodiment, the computer 20 is substituted for a mobile device 50. The mobile device 50 uses a communication means 11 to connect to the communication hub 10, which can be a wired or wireless communication means. The communication hub 10 is also used by the mobile device 50 to collect a key data reading 3005 from the securing device's transponder 40. The communication hub 10 connects to the securing device's transponder 40 by using the RIFD communication device 114 and a communication means 13, which can be wired or wireless communication means. When collected, the key data reading 3005 is sent to server

70 to extrapolate the key data 3003 to produce a vehicle specific securing device bypass 500.

Figure 7:
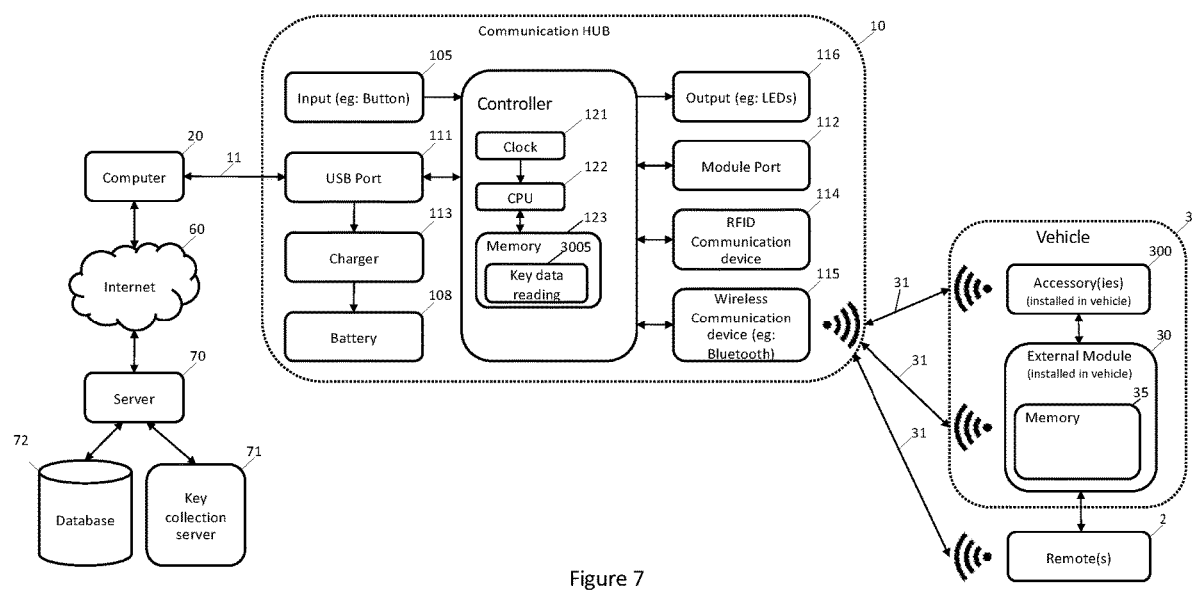
FIG. 7 depicts a schematic illustrating the function of the communication hub in accordance with an embodiment of the present invention.

Now referring to FIG. 7, which is another embodiment of the system to remotely flash an external module 30. In this embodiment, the communication hub 10 in this embodiment is used to interconnect the external module 30, which is already installed in the vehicle 3, with the computer 20 for the remote flashing configuration. The communication hub 10 is connected to the external module 30 using a wireless communication means 31 using wireless communication device 115. Wireless communication device 15 can also be used to interconnect other vehicle accessories 300 for remote flashing, configuring, or pairing purposes. Additionally, wireless communication device 115 can be used to connect to a remote 2 for the external module 30 and remotely flash, program, or configure the remote 2 to add functionality to an existing vehicle key or the external module's transponder bypass to allow it to start the vehicle.

Figure 8:
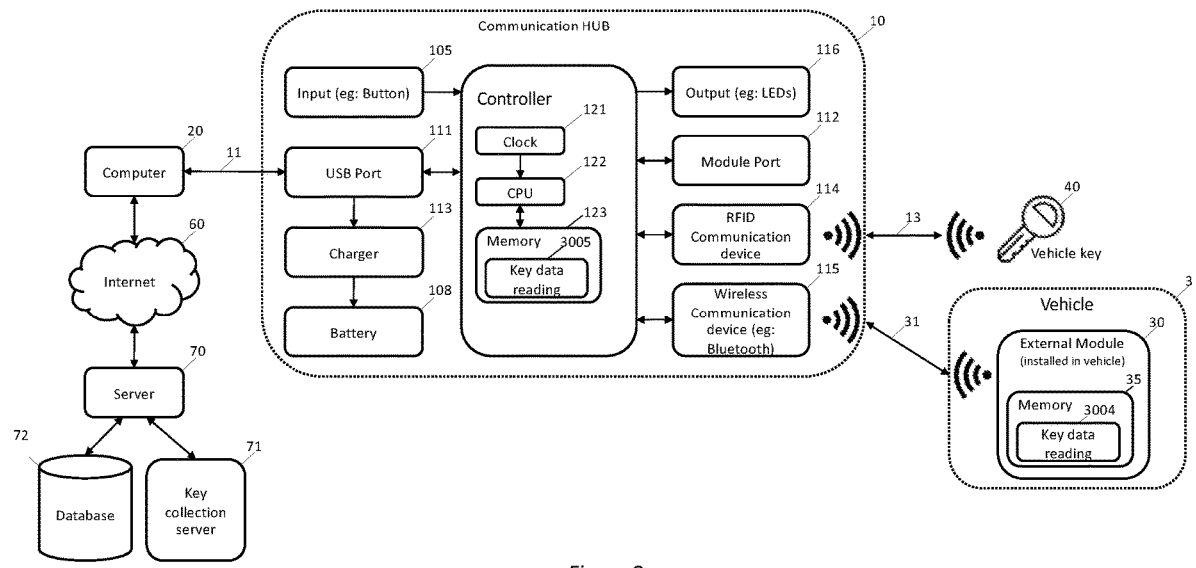
FIG. 8 depicts a schematic illustrating the function of the communication hub in accordance with an embodiment of the present invention.

Now referring to FIG. 8, which is another embodiment of the system to remotely flash an external module 30. In this embodiment, the communication hub 10 in this embodiment is used to interconnect the external module 30, which is already installed in the vehicle 3, with the computer 20 for the remote flashing configuration. The communication hub 10 is connected to the external module 30 using a wireless communication means 31 using wireless communication device 115. Additionally in this embodiment, the communication hub 10 is also used by the computer 20 to collect a key data reading 3005 from the securing device's transponder 40. The communication hub 10 connects to the securing device's transponder 40 by using the RIFD communication device 114 and a communication means 13, which can be wired or wireless communication means. When collected, the key data reading 3005 is sent to server 70 to extrapolate the key data 3003 and produce a vehicle specific securing device bypass 500.

Figure 9:
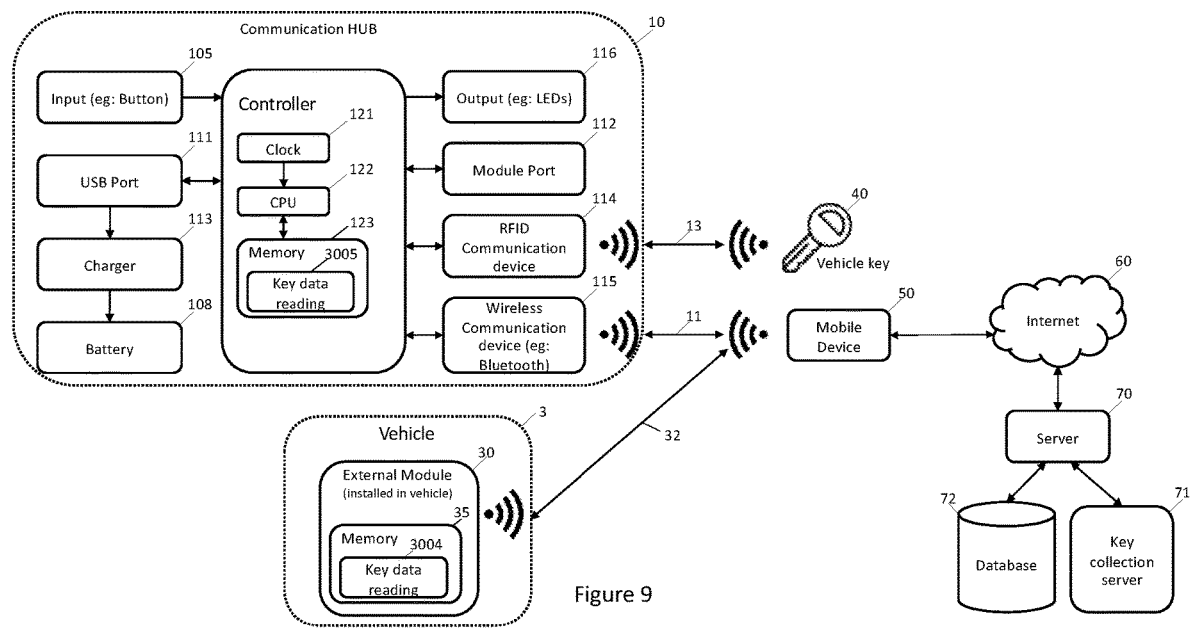
FIG. 9 depicts a schematic illustrating the function of the communication hub in accordance with an embodiment of the present invention.

Now referring to FIG. 9, which is another embodiment of the system to remotely flash an external module 30. In this embodiment, the computer 20 is substituted for a mobile device 50. The mobile device 50 uses a communication means 11 to connect to the communication hub 10, which can be a wired or wireless communication means. The communication hub 10 is used by the mobile device 50 to collect key data reading 3005 from the securing device's transponder 40. The communication hub 10 connects to the securing device's transponder 40 by using the RIFD communication device 114 and a communication means 13, which can be wired or wireless communication means. When collected, the key data reading 3005 is sent to server 70 to extrapolate the key data 3003 and produce a vehicle specific securing device bypass 500.

More particularly, in this embodiment, the mobile device 50 is directly connected the external module 30, which is already installed in the vehicle 3. The mobile device 50 is used for the remote flashing configuration. To that end, the mobile device 50 accesses the web server 70 through a communication method 60, such as an Internet protocol, a web-service or any remote call procedure. The mobile device 50 may be configured to access a reference table or data source 72 of computer programs 400 per car model or manufacturer. The web server 70 is compiled and configured to access and fetch the database based on input parameters such as manufacturer, model or physical location securing device model. The key collection server 71 is configured to generate a securing device bypass 500 based on the information retrieved from the data source 72. Such generated securing device bypass 500 allows the bypass of the securing devices 301 and 302 on a request from the user. The mobile device 50 is connected to the external module 30 using a wireless communication means 32 (e.g., Bluetooth).

Figure 10:
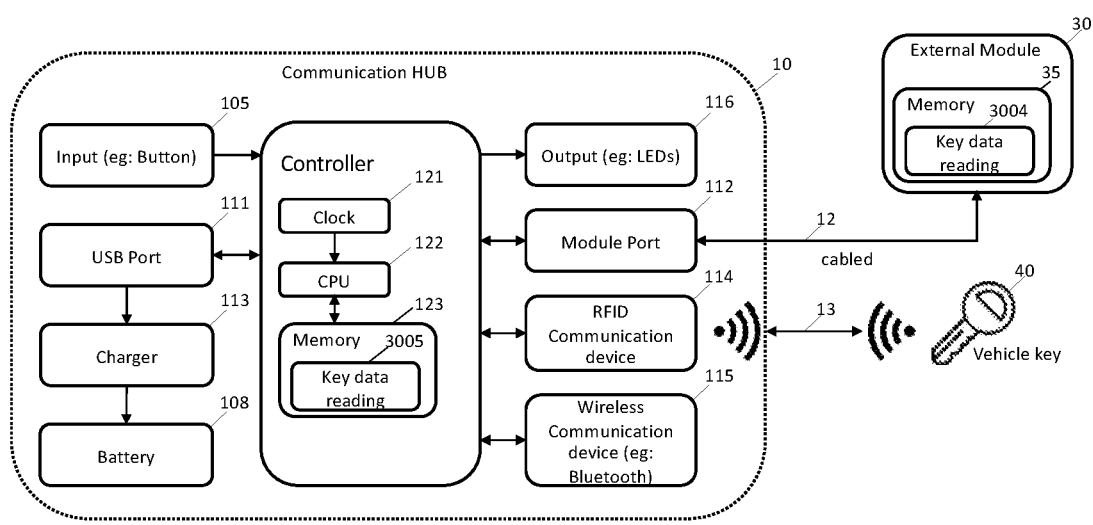
FIG. 10 depicts a schematic illustrating the function of the communication hub in accordance with an embodiment of the present invention.

Now referring to FIG. 10, which is another embodiment of the system to remotely flash an external module 30. In this embodiment, the communication hub 10 is used by the external module 30 to collect a key data reading 3005 from the securing device's transponder 40. The communication hub 10 connects to the securing device's transponder 40 by using the RIFD communication device 114 and a communication means 13, which can be wired or wireless communication protocol. When collected, the key data reading 3005 is sent to server 70 to extrapolate the key data 3003 and produce a securing device bypass 500. The module is also installed in the vehicle 3 and connected via a connection means 12 to the module port 112. After this process, the external module 30 can be disconnected from the vehicle 3 and be remotely flashed by the processes described above when it is reconnected to the computer 20 or mobile device 50.

The communication hub 10 is used by the external module 30 as a wired hardware extension to collect wireless vehicle key readings (e.g. key data) during module flashing process. Since the communication hub 10 is a hardware extension for the external module 30, the key data reading 3005 may be merged into the other key data readings 3004 as needed. Then the external module 30 may be disconnected from the vehicle and be remotely flashed by the processes described above when it is reconnected to a computer 20 or mobile device 50. In the alternative, the communication hub itself may complete the remote flashing process without the need to connect back to a computer 20 or mobile device 50.

Figure 11:
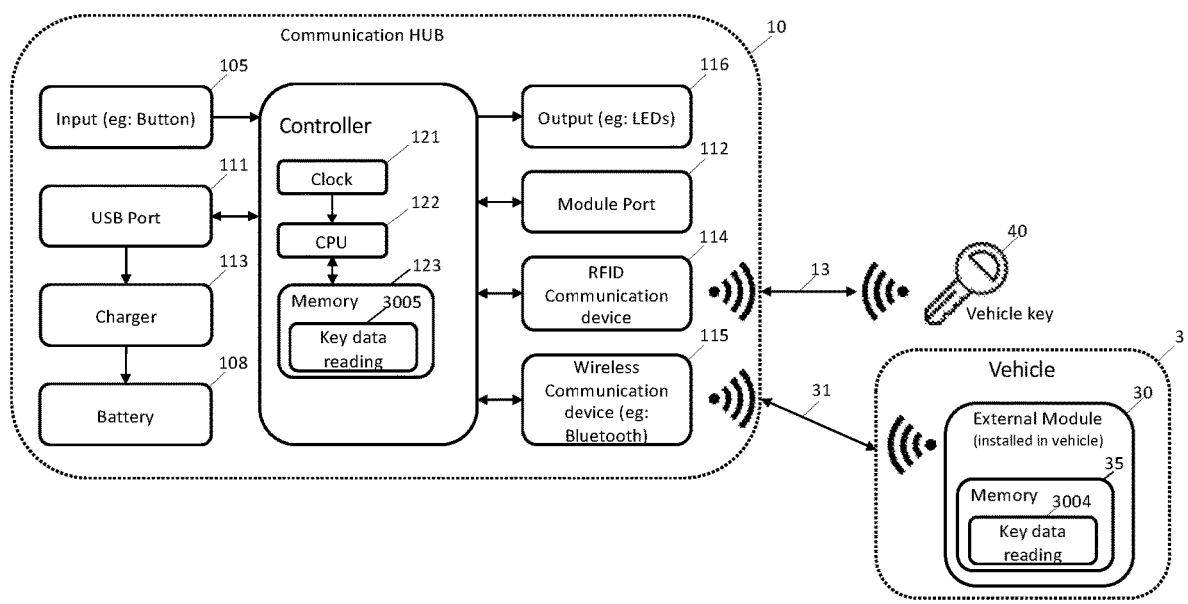
FIG. 11 depicts a schematic illustrating the function of the communication hub in accordance with an embodiment of the present invention.

Now referring to FIG. 11, which is another embodiment of the system to remotely flash an external module 30. In this embodiment, the communication hub 10 is used by the external module 30 to collect a key data reading 3005 from the securing device's transponder 40. The communication hub 10 connects to the securing device's transponder 40 by using the RIFD communication device 114 and a communication means 13, which can be wired or wireless communication means. When collected, the key data reading 3005 is sent to server 70 to extrapolate the key data 3003 and produce a vehicle specific securing device bypass 500. The module is also installed in the vehicle 3 and connected via a connection means 31 to the wireless communication device 115. After this process, the external module 30 can be disconnected from the vehicle 3 and remotely flashed by the processes described above when it is reconnected to the computer 20 or mobile device 50. In the alternative the external module 30 may be flashed wirelessly while it is still connected to the vehicle 3.

The communication hub 10 is used by the external module 30 as a wireless hardware extension to collect wireless vehicle key readings (e.g., key data) during the module flashing process. Since the communication hub 10 is a hardware extension for the external module 30, the key data reading 3005 may be merged into the other key data readings 3004 as needed.

Then the external module 30 may be disconnected from the vehicle and be remotely flashed by the processes described above when it is reconnected to a computer 20 or mobile device 50. In the alternative, the communication hub itself may complete the remote flashing process without the need to connect back to a computer 20 or mobile device 50.

Figure 16:
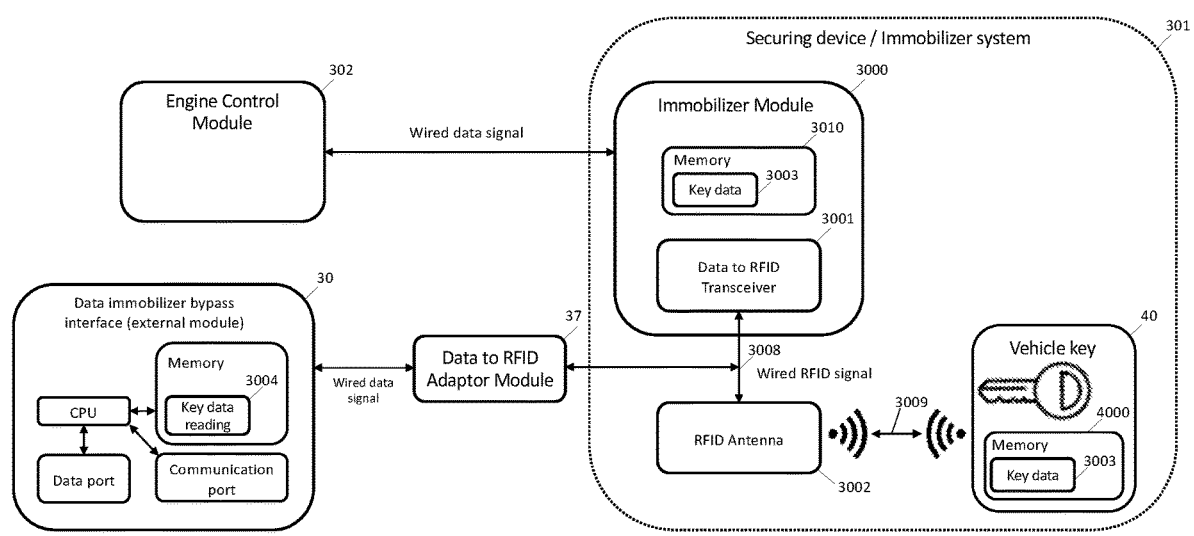
FIG. 16 depicts a schematic showing the component used to bypass a vehicle immobilizer with an embodiment of the present invention.

More particularly as shown in FIG. 16, the external module 30 is attached to a data to RFID adaptor module 37, which in turn is linked to the connection between the data to RFID transceiver module 3001 and the RFID antenna 3002. The RFID adaptor module 37 is primarily adapted to be compatible with vehicle RFID signal so that the external module 30 can emulate a vehicle key 40 during remote start process.

Using this type of configuration, the external module is capable of collecting, listening, or observing the communication exchanged from the immobilizer module 3000 to the vehicle key 40 and that are recorded by the external module 30 as key data readings 3004. The communication hub 10 can also be used during this process. The communication hub 10 can replay or rebroadcast the key data readings 3004 to the vehicle key 40 so communication hub 10 can collect any information from regarding the communication from vehicle key 40 to the immobilizer module 3000. The communication hub can thus collect a second key data reading 3005. With key data readings 3004 and 3005, the key collection server 71 can extrapolate key data 3003 to generate 500.

One skilled in the art could combine the capability of the communication hub 10 into the RFID adaptor module 37 such that it could observe communication exchange from the immobilizer module 3000 to the vehicle key 40 and from the vehicle key 40 to the immobilizer module 3000.

After this process is complete, the external module 30 can emulate the vehicle key 40 and communicate with immobilizer module 3000 during a remote start operation so that the immobilizer module 3000 and engine control module 302 will believe there is a valid vehicle key 40 and the engine can run normally.

Figure 17:
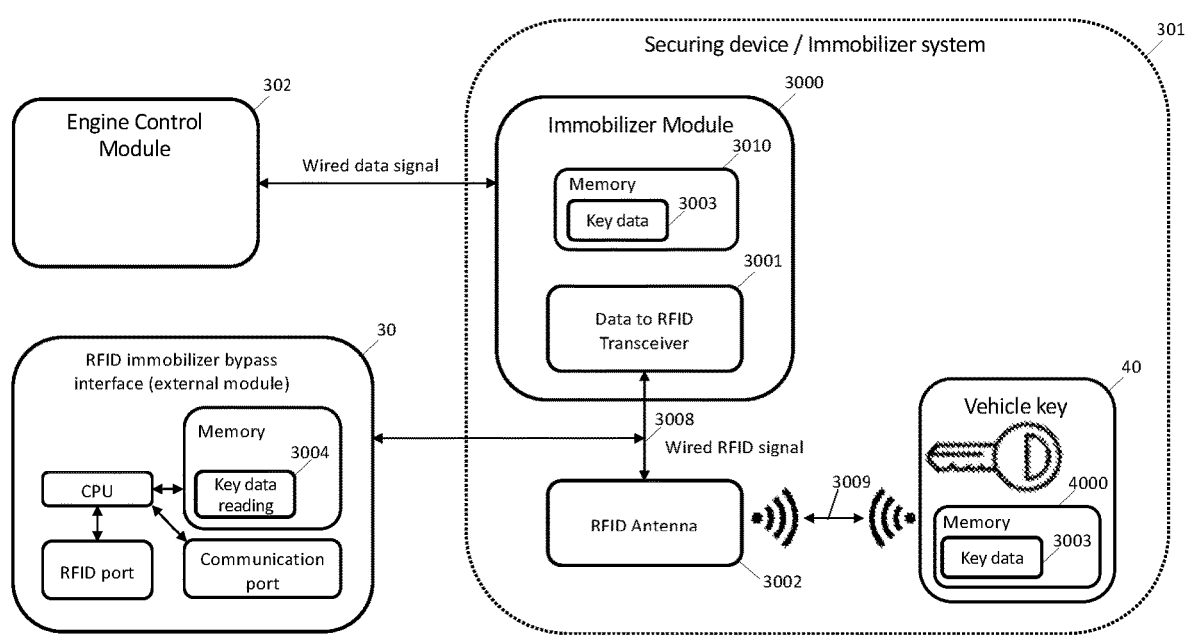
FIG. 17 depicts a schematic showing the components to bypass a vehicle immobilizer with an embodiment of the present invention.

Additionally as depicted in FIG. 17, one skilled in the art may combine the communication hub 10 and/or the data to RFID adaptor module 37 into the external module 30, such that less components are required for the remote flashing process. However, such a combination of hardware could potentially make the external module 30 prohibitively expensive to produce.

Figure 35:
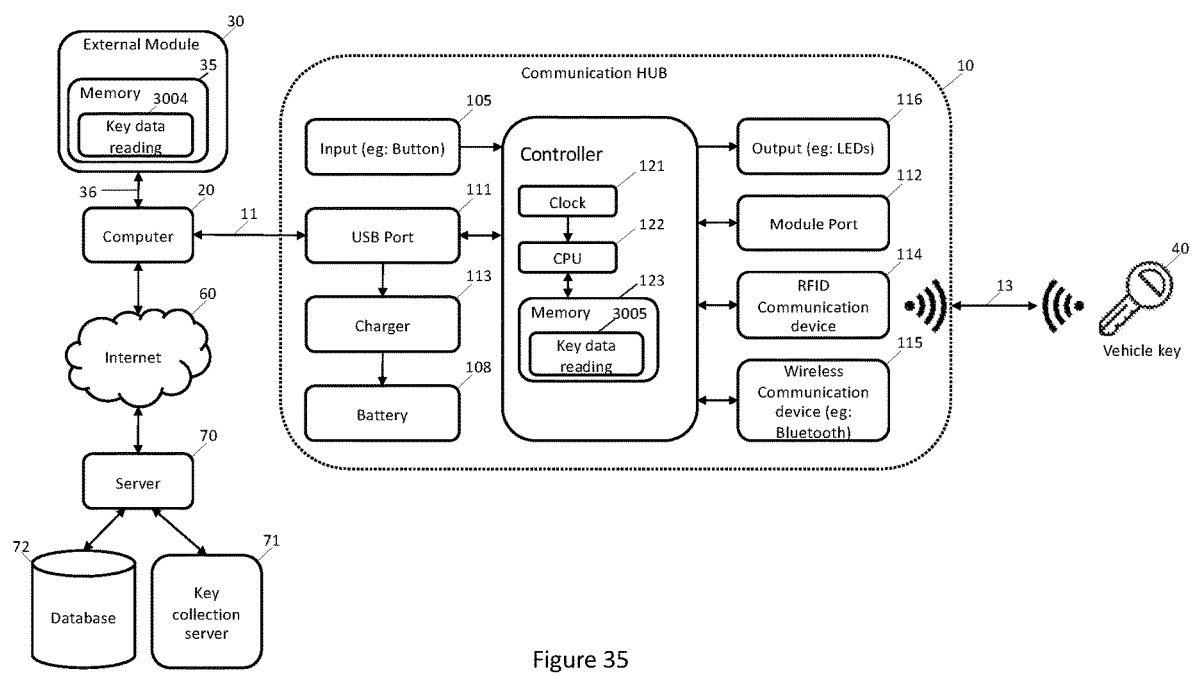
FIG. 35 depicts a schematic showing the components to bypass a vehicle immobilizer in accordance with an embodiment of the present invention.

Moreover, in another embodiment, FIG. 35 depicts an external module 30 that is connected directly to computer 20 through connection 36. Connection 36 may be any wired, wireless, or internet protocol known in the art. In this embodiment, the communication hub 10 is connected on computer 20 to collect key data reading 3005 on vehicle key 40 while external module 30 is connected to the computer 20.

Figure 34:
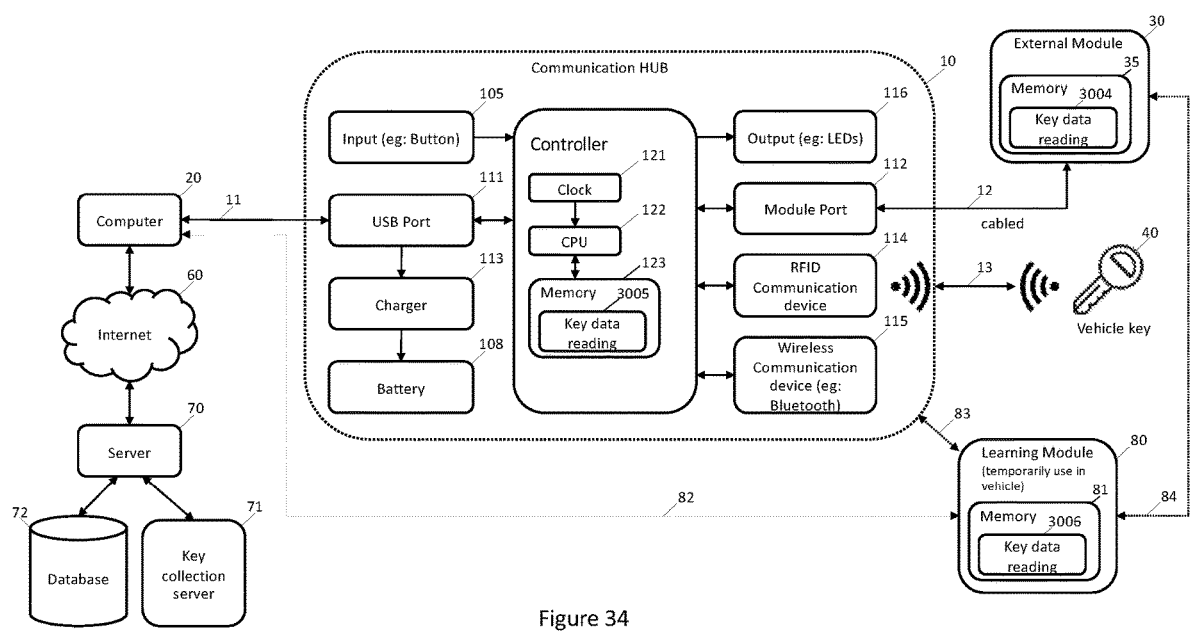
FIG. 34 depicts a schematic showing the components to bypass a vehicle immobilizer with a learning module in accordance with an embodiment of the present invention.

Other preferred embodiments include implementing the learning module 80. As shown in FIG. 34, the learning module is implemented in a system similar to the one discussed in FIG. 4 above. Specifically, the communication hub 10 connected on computer 20 to remotely flash an external module 30, with a key data reading 3005 collected from vehicle key 40 using the communication hub 10. Additional key data readings 3004, 3006 may be collected using the learning module 80 and/or external module 30.

Figure 36:
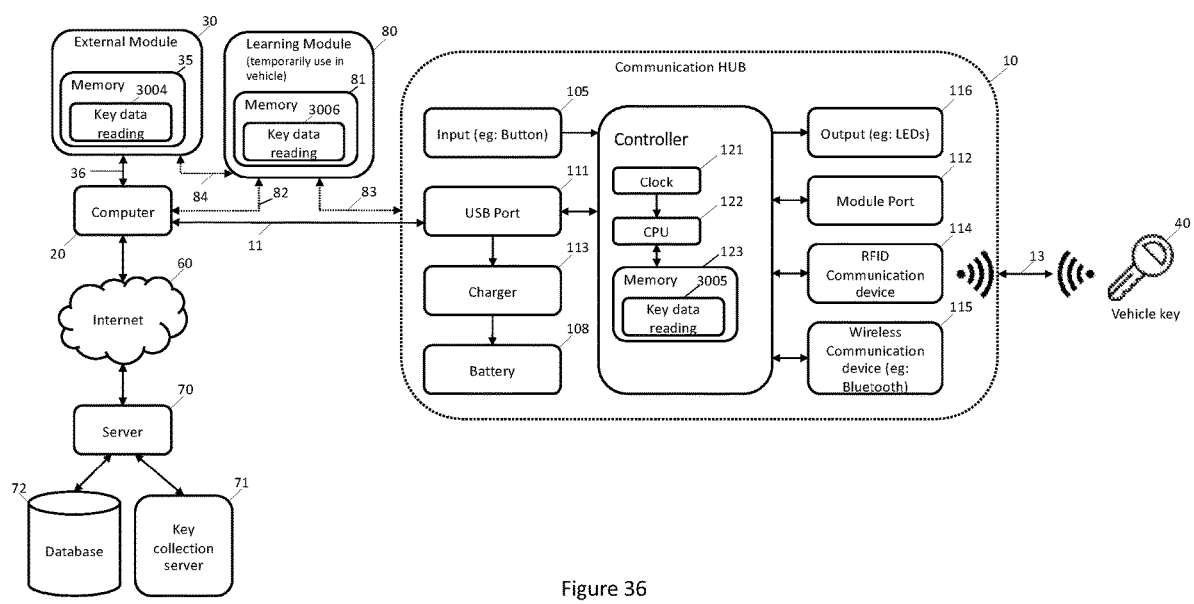
FIG. 36 depicts a schematic showing the components to bypass a vehicle immobilizer with a learning module in accordance with an embodiment of the present invention.

As shown in in FIG. 36, the learning module is integrated into the system depicted previously in FIG. 35. The communication hub 10 is connected to a computer 20 to collect key data reading 3005 from the vehicle key 40 while the external module 30 is connected to the computer 20. Additional key data readings 3004, 3006 may be collected using the learning module 80 and/or external module 30.

Figure 37:
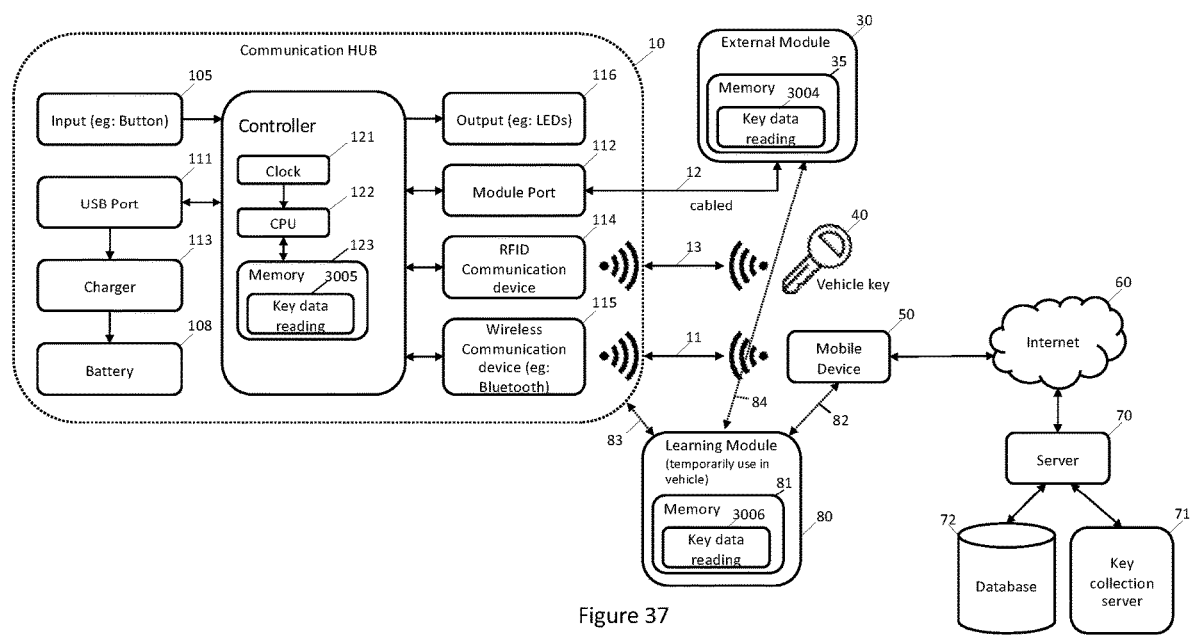
FIG. 37 depicts a schematic showing the components to bypass a vehicle immobilizer with a learning module in accordance with an embodiment of the present invention.

As shown in in FIG. 37, the learning module is integrated into the system depicted previously in FIG. 6. The communication hub 10 is connected to a mobile device 50 over a wireless connection, (e.g., Bluetooth) to remotely flash the external module 30 with key data reading 3005 from the vehicle key 40. Additional key data readings 3004, 3006 may be collected from learning module 80 and/or the external module 30.

Figure 38:
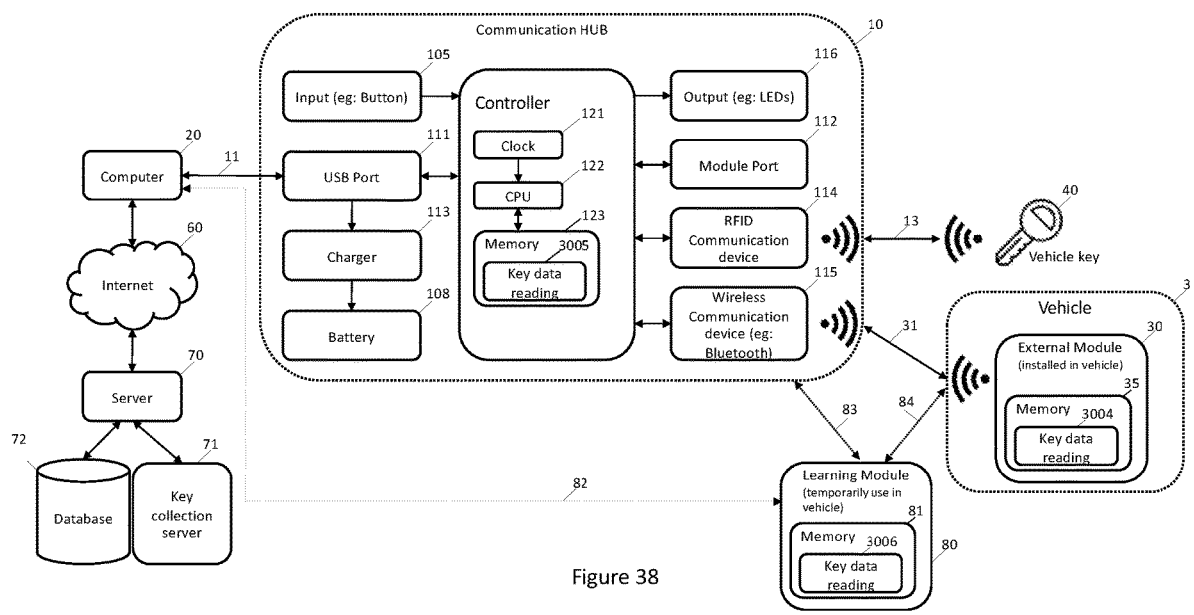
FIG. 38 depicts a schematic showing the components to bypass a vehicle immobilizer with a learning module in accordance with an embodiment of the present invention.

As shown in in FIG. 38, the learning module is integrated into the system depicted previously in FIG. 8. The communication hub 10 is connected on computer 20 to wirelessly remotely flash an external module 30 with key data reading 3005 from the vehicle key through the communication hub 10 and additional key data readings 3004, 3006 may be collected from learning module 80 and/or external module 30.

Figure 39:
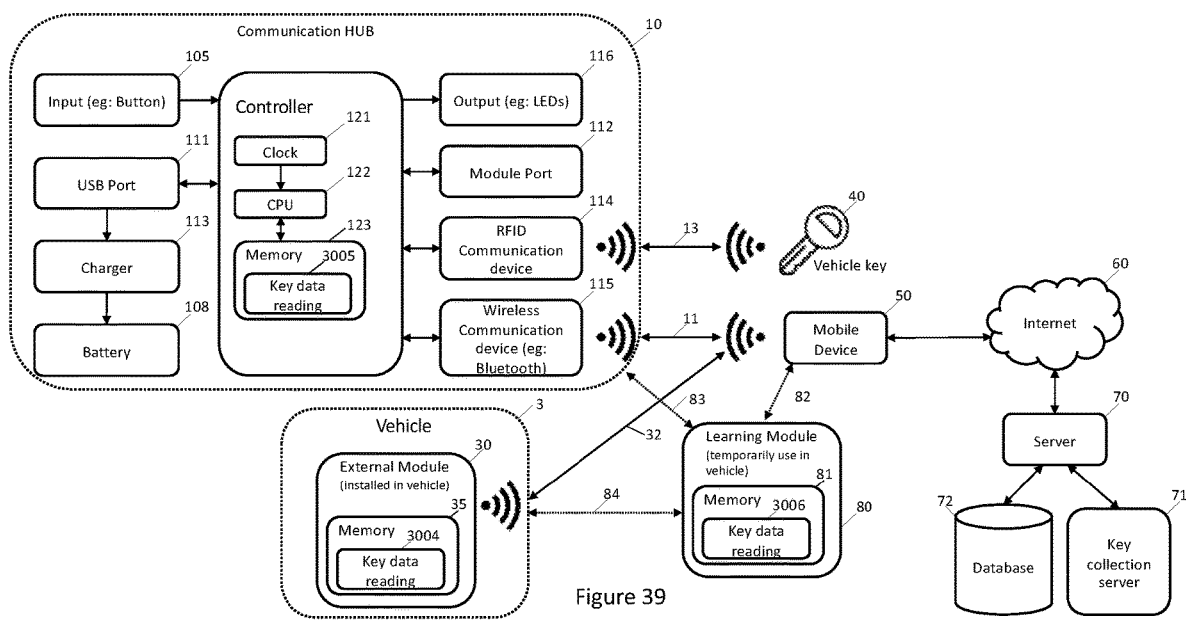
FIG. 39 depicts a schematic showing the components to bypass a vehicle immobilizer with a learning module in accordance with an embodiment of the present invention.

As shown in in FIG. 39, the learning module is integrated into the system depicted previously in FIG. 9. The communication hub 10 is connected to a mobile device 50 over wirelessly (e.g., Bluetooth) to collect a key data reading 3005 on a vehicle key 40 to remotely flash an external module 30. Additional key data readings 3004, 3006 may be collected from learning module 80 and/or external module 30 as needed.

Figure 40:
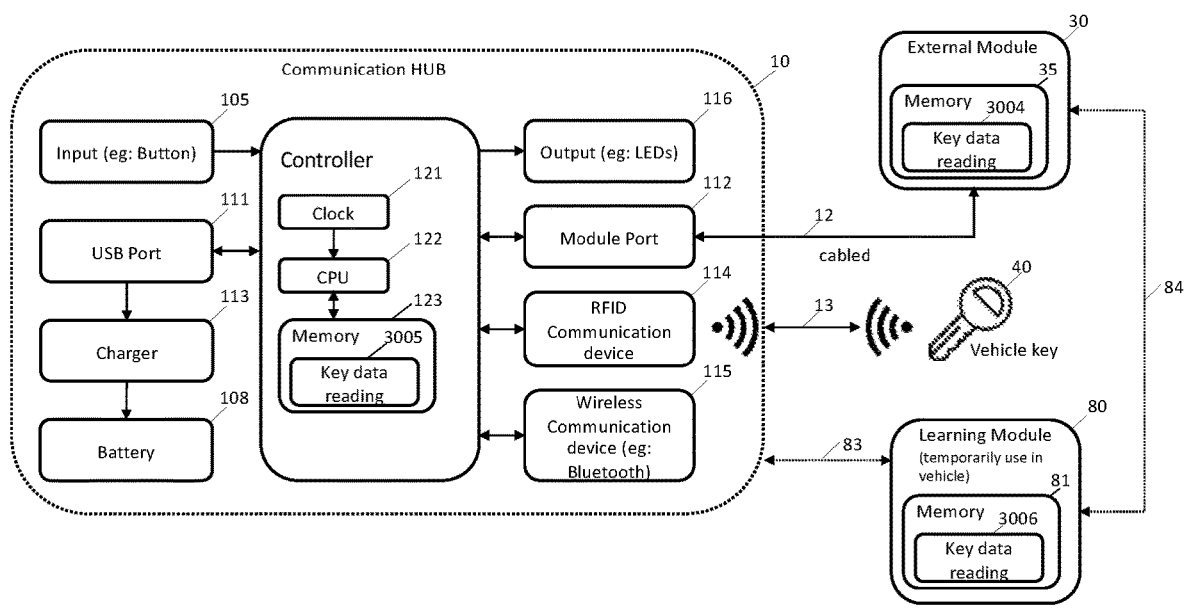
FIG. 40 depicts a schematic showing the components to bypass a vehicle immobilizer with a learning module in accordance with an embodiment of the present invention.

As shown in in FIG. 40, the learning module is integrated into the system depicted previously in FIG. 10. The communication hub 10 is connected to the external module 30 to collect key data reading 3005 on vehicle key 40. Additional key data readings 3004, 3006 may be collected from learning module 80 and/or external module 30. Since the learning module 80 is a hardware extension for the external module 30, the key data reading 3006 may be merged into the other key data readings 3004, 3005 as needed.

Figure 41:
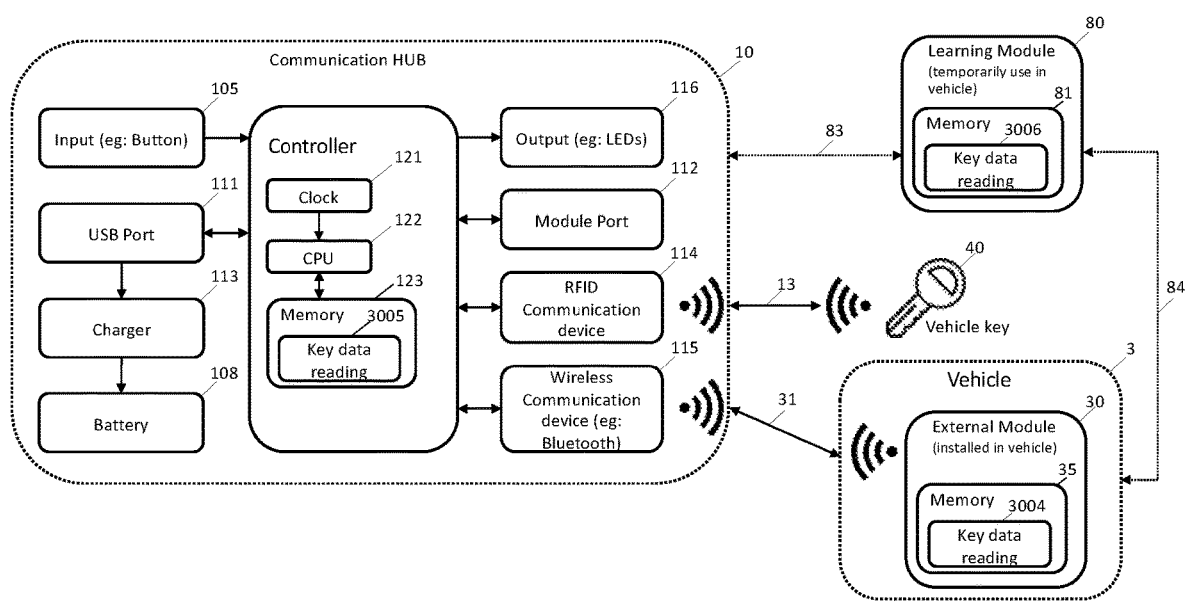
FIG. 41 depicts a schematic showing the components to bypass a vehicle immobilizer with a learning module in accordance with an embodiment of the present invention.

As shown in in FIG. 41, the learning module is integrated into the system depicted previously in FIG. 11. The communication hub 10 is wirelessly connected to an external module 30 to collect a key data reading 3005 on a vehicle key 40. Additional key data readings 3004, 3006 may be collected from learning module 80 and/or external module 30. Since the learning module 80 is a hardware extension for the external module 30, the key data reading 3006 may be merged into the other key data readings 3004, 3005 as needed.

DETAILED DESCRIPTION OF THE METHOD

As discussed above, in a preferred embodiment, the physical location to be secured is embodied by a vehicle 3. In another embodiment, any physical location, such a house or an office, secured by a securing device and where control must be gained shall benefit from the usage of a method to remotely flash an external module.

The methods to remotely flash an external module 30 generally comprise the steps to electronically transfer a computer program 400, such as a firmware or portable software, from a computer device to an external module 30, to install the external module into a vehicle 3, to collect key data readings from a securing device 301, to transfer the key data reading 3004 to a computer 20 (the computer 20 of this particular method and for all subsequent methods may be substituted for a mobile device 50 or any other equivalent computing device known in the art), to analyze and process the key data reading 3004 with a server 70 to extrapolate the key data 3003 to generate a securing device bypass 500 allowing the external module 30 to communicate with the securing device 301 and to transfer the generated securing device bypass 500 to the external module 30. In preferred embodiments, the securing device bypass 500 may be comprised of a computer program or parameters that are embedded in the external module's memory 35 to be accessible by a computer program such as the external module's firmware.

Figure 18:
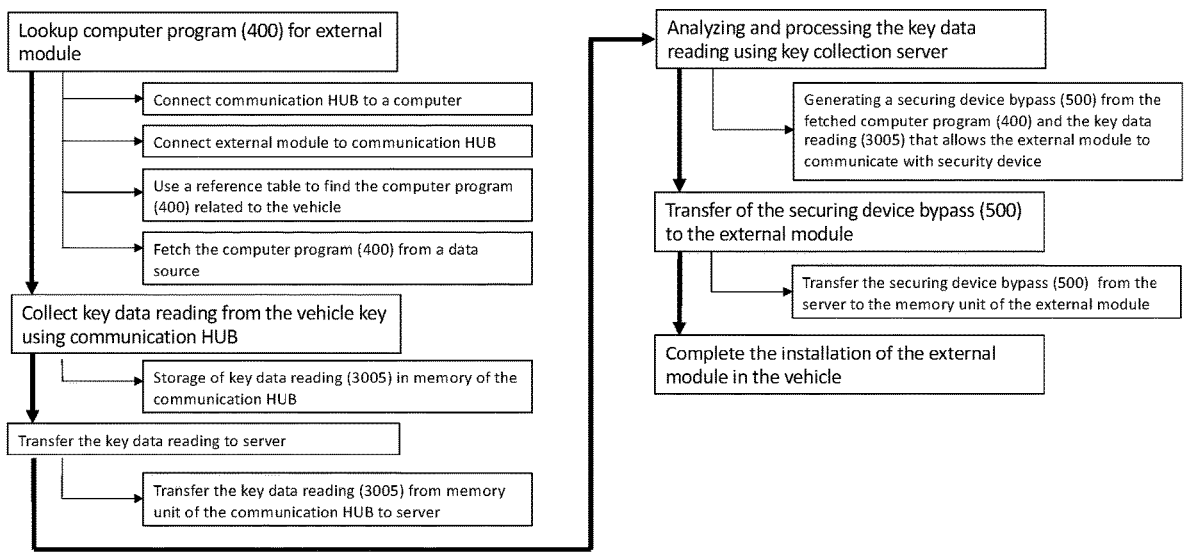
FIG. 18 depicts a flowchart showing the process of bypassing a vehicle immobilizer in accordance with an embodiment of the present invention.

More particularly, FIG. 18, shows one method to remotely flash an external module 30. The steps generally comprise of connecting the communication hub 10 to a computer 20, mobile device 50, or some equivalent computing device. In some instances (including for this method and every method described hereafter) the communication hub 10 may also be connected to an external module 30. In situations where the communication hub 10 is not connected to the external module 30, the external module 30 is connected to the computer 20, mobile device 50, or some equivalent computing device.

The user will then access the server 70, to select the correct computer program 400 for the external module 30 that corresponds to the make and model of the vehicle 3 into which the external module 30 will be installed.

This process may include steps comprising of using a reference table to find the computer program related to the vehicle 3 to be secured in which the external module 30 must be installed, to fetch, retrieve or order the computer program from a data source or to use calculations to obtain the computer program 400. The reference table may be an electronic or physical document or be embodied as a searchable data source such as a database, XML file or any other searchable data container. To ensure optimize performances, it shall be noted by the skilled addressee that reference table shall be indexed. The computer program may be retrieved the computer program from the data source through a computer program using client-server architecture or through a browser accessing a web-based application. The data source may be any type of database, such as an XML file, a pre-compiled table, a graphical card having GPU, an array of FPGA or a cloud-based storage.

Depending on the vehicle 3, the server 70 may then require the communication hub 10 to communicate with the vehicle key 40 corresponding to the vehicle 3. To facilitate the communication, the user may insert the vehicle key 40 into a RFID communication device 114 of the communication hub 10. One skilled in the art may understand that the communication hub 10 may be substituted for any device that can communicate with the vehicle key 40 to collect key data readings.

When the vehicle key 40 is engaged with the key reader (e.g., communication hub 10 or any equivalent device), the server 70 may request computer 20 to collect a key data reading 3005 from the vehicle key 40 and use the computer 20 to send the key data reading 3005 to the server 70. The key data reading 3005 may be stored in the memory 123 of the controller 120 of the communication hub 10 prior to the transfer.

The key data reading 3005 may then be transferred to a computer 20 with steps by using a computer network transfer protocol such as TCP/IP, wireless signal, such as Wi-Fi, or a communication cable, such as a USB or Firewire™ cable. The key data in turn is transferred to the server 70.

Upon transferring the key data reading 3005, the server 70 analyzes and processes the key data reading 3005 in the key collection server 71. Using the key data reading 3005 and the information related to the manufacturer and/or model of the vehicle as input, key collection server 71 can extrapolate the key data 3003 to generate a securing device bypass 500 that allows the external module to communicate with the securing device of the vehicle 3000. In another embodiment, it may be required to manually enter additional information, such as an identification number, a serial number or any unique identification information, to allow the server 70 to generate the securing device bypass 500.

In another preferred embodiment, the process of taking key data readings 3005 and sending the data to server 70 and key collection server 71 can performed in a loop until the key data 3003 can be extrapolated. For example, the first key data reading 3005 is collected and sent to the key collection server 71 to calculate a first subset of data. A second key data reading 3005 is collected and sent to the key collection server 71 to calculate a second subset of data. This process can be performed in a loop until the key data 3003 is extrapolated. This process can be applied to other remote flashing methods as well to extrapolate key data 3003.

The securing device bypass 500 is then transferred back to the external module 30, which comprises the steps electronically transfer the securing device bypass 500 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and installed in the vehicle 3 and capable of bypassing the securing device 301.

Figure 19:
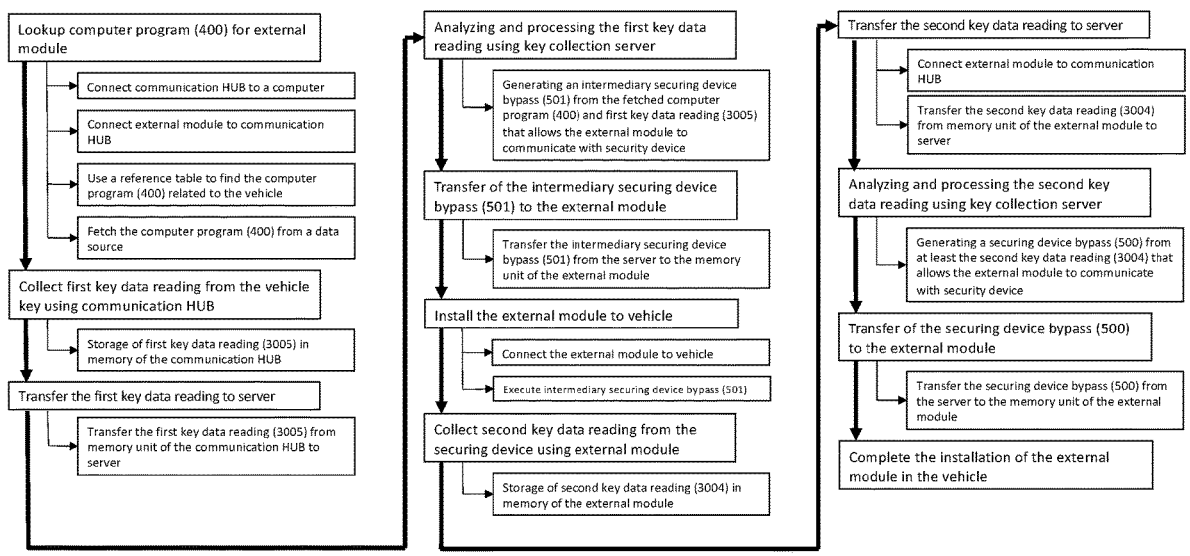
FIG. 19 depicts a flowchart showing the process of bypassing a vehicle immobilizer in accordance with an embodiment of the present invention.

FIG. 19 shows another method to remotely flash an external module 30. The steps generally comprise of connect the communication hub 10 to computer 20. The communication hub 10 is then connected to an external module 30. The user will then access the server 70, to select the correct computer program 400 for the external module 30 that corresponds to the make and model of the vehicle 3 into which the external module 30 will be installed.

The server 70 may then require the communication hub 10 to communicate with the vehicle key 40 corresponding to the vehicle 3. To facilitate the communication, the user may insert the vehicle key 40 into a RFID communication device 114 of the communication hub 10.

When the vehicle key 40 is inserted, the server 70 may request computer 20 to collect a key data reading 3005 from the vehicle key 40 and use the computer 20 to send the key data reading 3005 to the server 70. The key data reading 3005 when collected, may be stored in the memory 123 of the controller 120 of the communication hub 10.

The key data reading 3005 may then be transferred to a computer 20 by using a computer network transfer protocol such as TCP/IP, wireless signal, such as Wi-Fi, or a communication cable, such as a USB or Firewire™ cable. The key data reading 3005 in turn is transferred to the server 70.

Upon transferring the key data reading 3005, the server 70 analyzes and processes the key data reading 3005 in the key collection server 71. Using the key data reading 3005 and the information related to the manufacturer and/or model of the vehicle as input, key collection server generate an intermediary securing device bypass 501 that allows the external module to communicate with the securing device 301 of the vehicle 3. In another embodiment, it may be required to manually enter additional information, such as an identification number, a serial number or any unique identification information, to allow the server 70 to generate an intermediary securing device bypass 501.

The intermediary securing device bypass 501 is then transferred back to the external module 30, which comprises the steps electronically transfer the intermediary securing device bypass 501 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and reinstalled in the vehicle 3, at which point the module is instructed to collect a second key data reading 3004 from the vehicle 3. This procedure generally comprises the steps of connecting the external module 30 to a vehicle 3 and to execute the intermediary securing device bypass 501. One skilled in the art will recognize that the specific connection method may vary for different vehicles from one manufacturer to the another and even from a particular vehicle model to another. The execution of the intermediary securing device bypass 501 on the external module 30 allows the collection of the key data 3004 from the securing device 301 and the acquiring and storage of the key data reading 3004 in a memory unit 35 of the external module 30. The key data reading 3004 in this step may include the direct collection of key data reading 3004 from immobilizer module 3000, an observation of the communication between immobilizer module 3000 and vehicle key 40, or any other communications involving the securing device 301.

After the collection of the second key data 3004, the external module 30 is reconnected to the communication hub 10 and computer 20, and the key data reading 3004 may then be transferred to a computer 20 by using a computer network transfer protocol such as TCP/IP, wireless signal, such as Wi-Fi, or a communication cable, such as a USB or Firewire™ cable. The key data reading 3004 in turn is transferred to the server 70.

Upon transferring the key data reading 3004, the server 70 analyzes and processes the key data reading 3004 in the key collection server 71. Using the key data reading 3004, the information related to the manufacturer and/or model of the vehicle as input, and/or the first key data reading 3005, the key collection server 71 can extrapolate the key data 3003 and generate a securing device bypass 500 that allows the external module to communicate with the securing device 301 of the vehicle 3. In another embodiment, it may be required to manually enter additional information, such as an identification number, a serial number or any unique identification information, to allow the server 70 to generate the securing device bypass 500.

The securing device bypass 500 is then transferred back to the external module 30, which comprises the steps electronically transfer the securing device bypass 500 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and reinstalled in the vehicle 3 and capable of bypassing the securing device 301.

Figure 20:
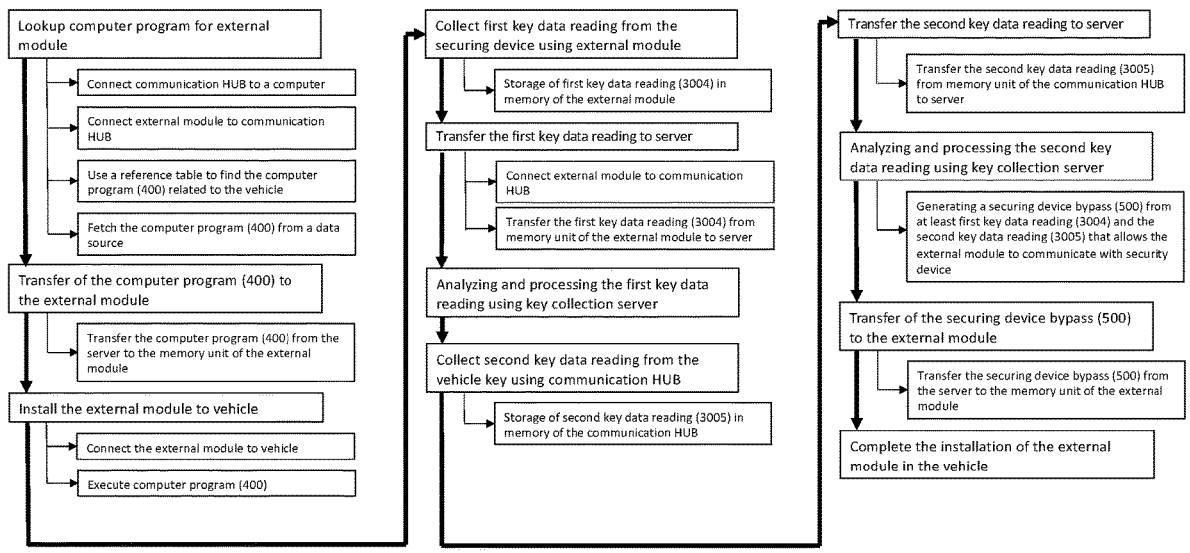
FIG. 20 depicts a flowchart showing the process of bypassing a vehicle immobilizer in accordance with an embodiment of the present invention.

FIG. 20, shows another method to remotely flash an external module 30. This method is similar to the method discussed for FIG. 19 above, except that the external module 30 is installed the vehicle first to collect key data reading 3004 from the securing device 301 before the key data reading 3005 is collected from the vehicle key 40. In some instances the communication hub 10 may require information regarding the previously gathered key data reading or from the server 70.

Figure 21:
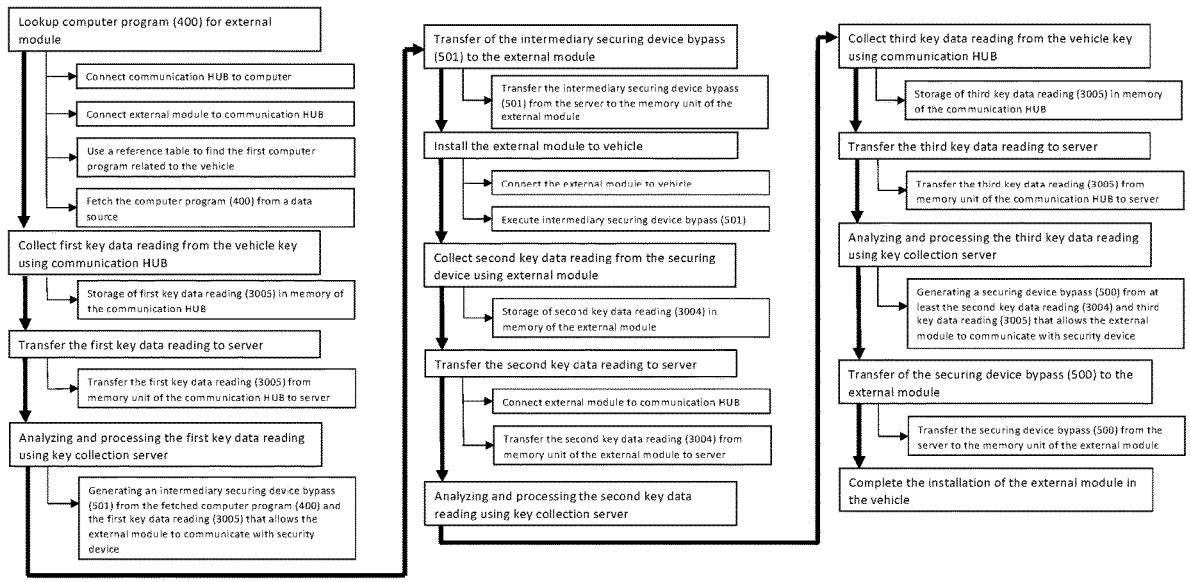
FIG. 21 depicts a flowchart showing the process of bypassing a vehicle immobilizer in accordance with an embodiment of the present invention.

FIG. 21, shows another method to remotely flash an external module 30. The steps generally comprise of connect the communication hub 10 to computer 20. The communication hub 10 is then connected to an external module 30. The user will then access the server 70, to select the correct computer program 400 for the external module 30 that corresponds to the make and model of the vehicle 3 into which the external module 30 will be installed. In some instances the communication hub 10 may require information regarding the previously gathered key data reading or from the server 70.

The server 70 may then require the communication hub 10 to communicate with the vehicle key 40 corresponding to the vehicle 3. To facilitate the communication, the user may insert the vehicle key 40 into a RFID communication device 114 of the communication hub 10.

When the vehicle key 40 is inserted, the server 70 may request computer 20 to collect a key data reading 3005 from the vehicle key 40 and use the computer 20 to send the key data reading 3005 to the server 70. The key data reading 3005 when collected, may be stored in the memory 123 of the controller 120 of the communication hub 10.

The key data reading 3005 may then be transferred to a computer 20 by using a computer network transfer protocol such as TCP/IP, wireless signal, such as Wi-Fi, or a communication cable, such as a USB or Firewire™ cable. The key data reading 3005 in turn is transferred to the server 70.

Upon transferring the key data reading 3005, the server 70 analyzes and processes the key data reading 3005 in the key collection server 71. Using the key data reading 3005 and the information related to the manufacturer and/or model of the vehicle as input, key collection server generates an intermediary securing device bypass 501 that allows the external module to communicate with the securing device 301 of the vehicle 3. In another embodiment, it may be required to manually enter additional information, such as an identification number, a serial number or any unique identification information, to allow the server 70 to generate the intermediary securing device bypass 501.

The intermediary securing device bypass 501 is then transferred back to the external module 30, which comprises the steps electronically transfer the intermediary securing device bypass 501 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and reinstalled in the vehicle 3, at which point the module is instructed to collect a second key data reading 3004 from the vehicle 3. This procedure generally comprises the steps of connecting the external module 30 to a vehicle 3 and to execute the intermediary securing device bypass 501. One skilled in the art will recognize that the specific connection method may vary for different vehicles from one manufacturer to the another and even from a particular vehicle model to another. The execution of the securing device bypass 501 on the external module 30 allows the collection of the key data reading 3004 from securing device 301 and the acquiring and storage of the key data in a memory unit 35 of the external module 30.

After the collection of the second key data reading 3004, the external module 30 is reconnected to the communication hub 10 and computer 20, and the key data reading 3004 may then be transferred to a computer 20 by using a computer network transfer protocol such as TCP/IP, wireless signal, such as Wi-Fi, or a communication cable, such as a USB or Firewire™ cable. The key data reading 3004 in turn is transferred to the server 70.

Upon transferring the key data reading 3004, the server 70 analyzes and processes the key data readings 3004, 3005 in the key collection server 71.

The server 70 may then require the communication hub 10 to communicate with the vehicle key 40 corresponding to the vehicle 3 for a second time. The vehicle key may be the same key or a different key depending on the make and model of the vehicle 3. To facilitate the communication, the user may insert the vehicle key 40 into a RFID communication device 114 of the communication hub 10.

When the vehicle key 40 is inserted, the server 70 may request computer 20 to collect key data reading 3005 from the vehicle key 40 and use the computer 20 to send the key data reading 3005 to the server 70. The key data reading 3005 when collected, may be stored in the memory 123 of the controller 120 of the communication hub 10.

The key data reading 3005 may then be transferred to a computer 20 by using a computer network transfer protocol such as TCP/IP, wireless signal, such as Wi-Fi, or a communication cable, such as a USB or Firewire™ cable. The key data reading 3005 in turn is transferred to the server 70.

Using the key data readings 3004 and 3005 (first and second) and the information related to the manufacturer and/or model of the vehicle as input, key collection server can extrapolate the key data 3003 to generate a securing device bypass 500 that allows the external module to communicate with the securing device 301 of the vehicle 3. In another embodiment, it may be required to manually enter additional information, such as an identification number, a serial number or any unique identification information, to allow the server 70 to generate securing device bypass 500.

The securing device bypass 500 is then transferred back to the external module 30, which comprises the steps electronically transfer the securing device bypass 500 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and reinstalled in the vehicle 3 and capable of bypassing the securing device 301.

Upon completion of the methods, a vehicle having a device securing the starting of the engine or the door opening may be securely by-passed by an external module 30.

Figure 22:
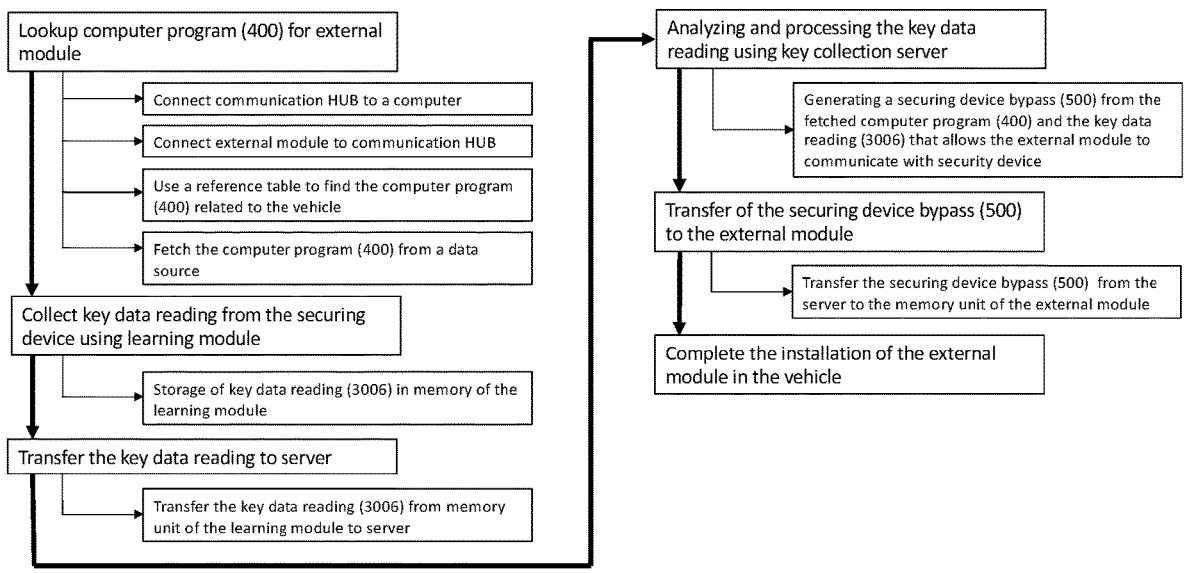
FIG. 22 depicts a flowchart showing the process of bypassing a vehicle immobilizer using a learning module in accordance with an embodiment of the present invention.

In addition to the preferred methods described above, the next series of methods describe similar methodologies that implement the learning module 80, which collect key data reading 3006 on the securing device 301. The learning module may collect readings in addition to or in substitution of key data reading 3005 (by the communication hub 10 or similar key reader), or a key data reading 3004 by the external module 30 itself. For example, FIG. 22 shows a method of generating a securing device bypass 500 using the learning module 80, which is analogous to the method shown in FIG. 18. In some instances, the learning module 80 may require information from the server 70.

Figure 23:
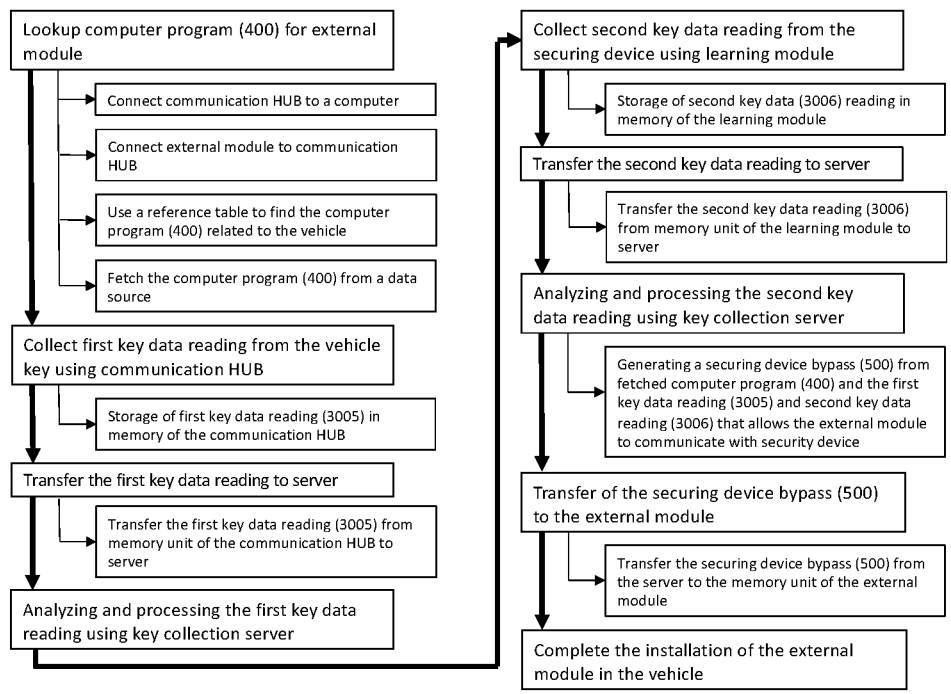
FIG. 23 depicts a flowchart showing the process of bypassing a vehicle immobilizer using a learning module in accordance with an embodiment of the present invention.

FIG. 23 shows a method to generate a securing device bypass 500 from key data reading 3005 of vehicle key 40 first, and then a key data reading 3006 by the learning module 80. This method is analogous to FIG. 19 with the implementation of the learning module 80. In some instances, the learning module 80 may require information regarding the previously gathered key data reading or from the server 70.

Figure 24:
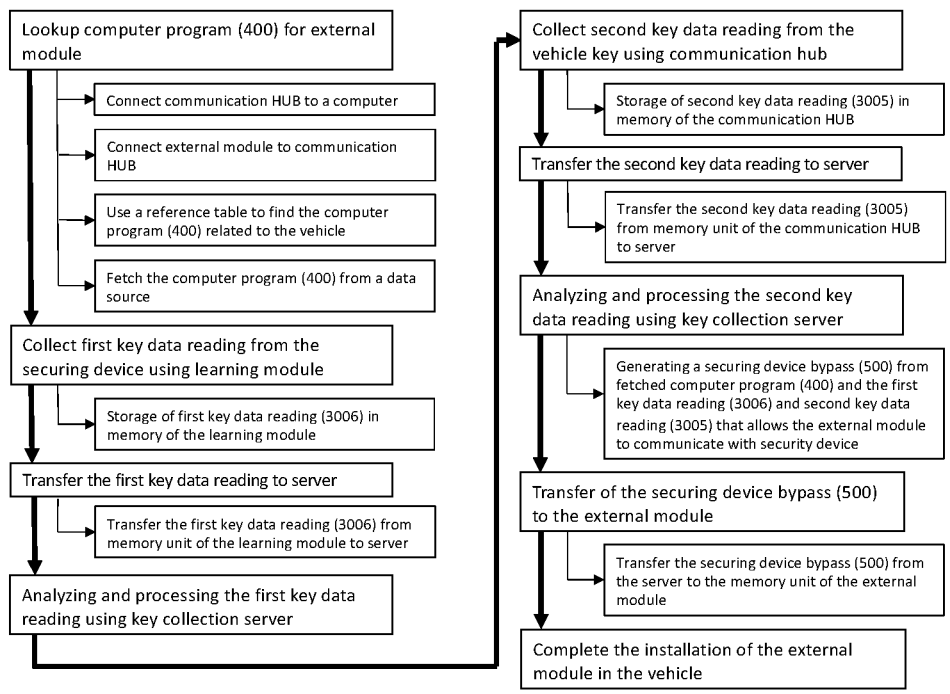
FIG. 24 depicts a flowchart showing the process of bypassing a vehicle immobilizer using a learning module in accordance with an embodiment of the present invention.

FIG. 24 shows a method of generating a securing device bypass 500 from a key data reading 3006 by the learning module first, and then a key data reading 3005 from vehicle key. This method is analogous to FIG. 20 with the implementation of the learning module 80. In some instances, the communication hub 10 may require information regarding the previously gathered key data reading or from the server 70. Additionally, the learning module 80 may require information from the server 70.

Figure 25:
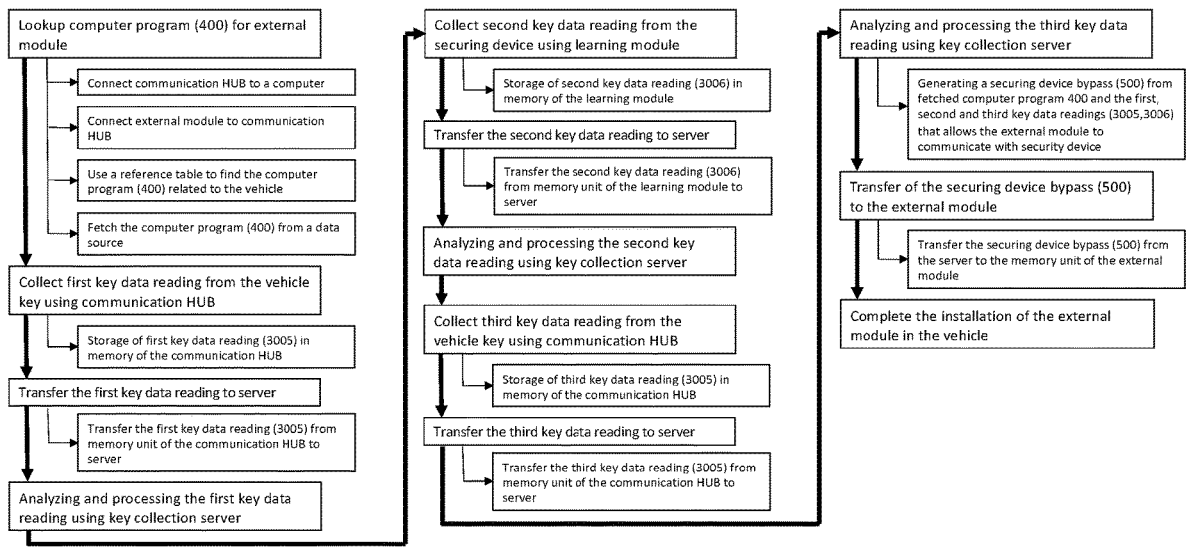
FIG. 25 depicts a flowchart showing the process of bypassing a vehicle immobilizer using a learning module in accordance with an embodiment of the present invention.

FIG. 25 shows a method to generate a securing device bypass 500 from key data reading 3005 of the vehicle key 40 first, then from key data reading 3006 of learning module 80 and a key data reading 3005 of vehicle key 40 once again. This method is analogous to FIG. 21 with the implementation of the learning module 80. In some instances, the learning module 80 may require information regarding the previously gathered key data reading or from the server 70. Additionally, the communication hub 10 may require information regarding the previously gathered key data reading or from the server 70.

Figure 26:
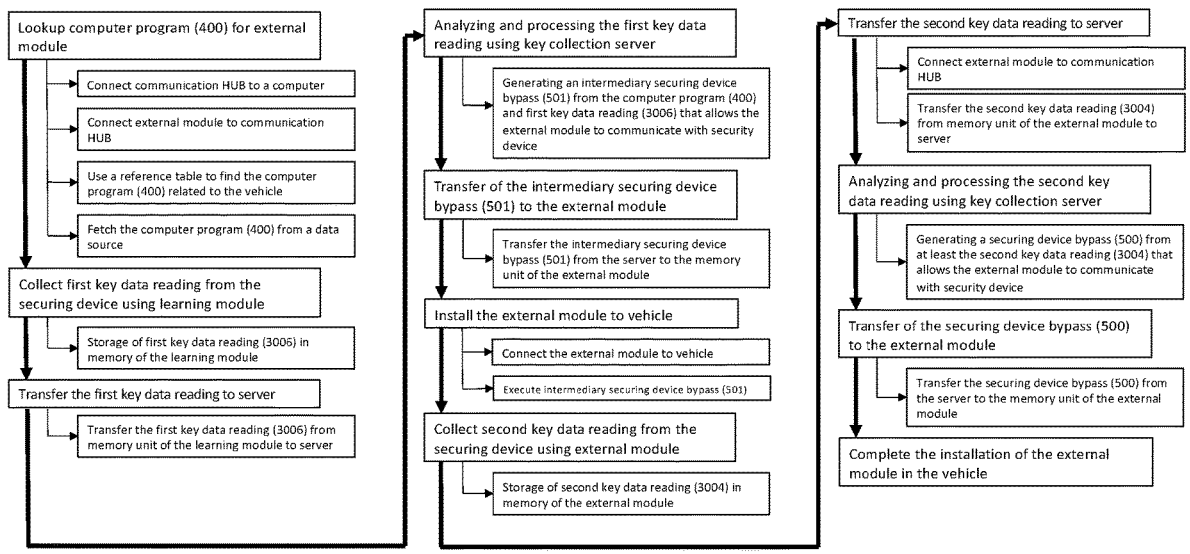
FIG. 26 depicts a flowchart showing the process of bypassing a vehicle immobilizer using a learning module in accordance with an embodiment of the present invention.

FIG. 26 shows a method to generate a securing device bypass 500 from key data reading 3006 by the learning module 80 first, and then a key data reading 3004 by the external module 30. In some instances, the learning module 80 may require information from the server 70.

Figure 27:
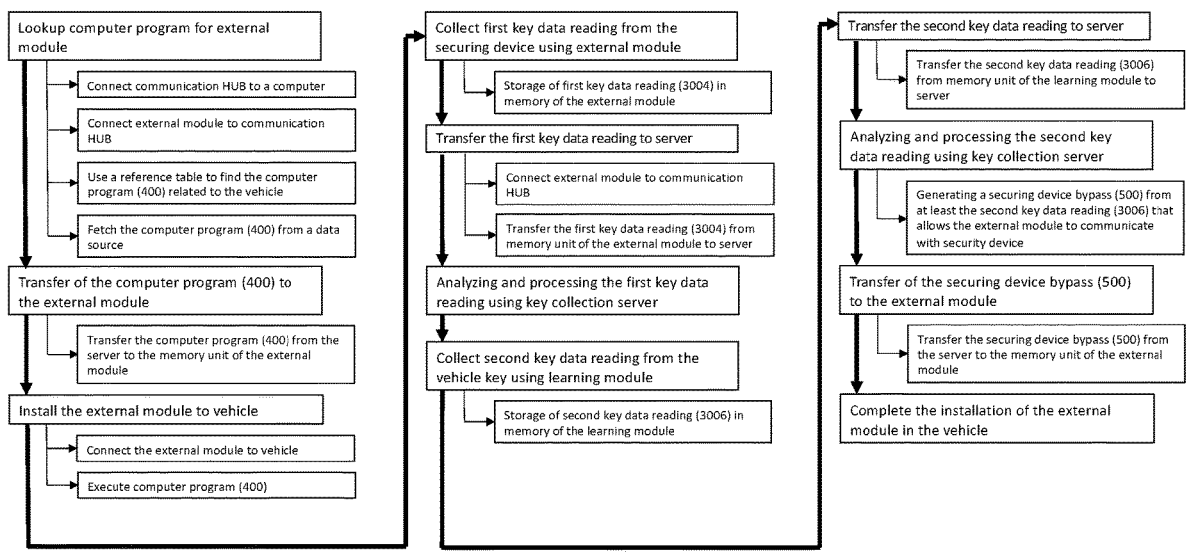
FIG. 27 depicts a flowchart showing the process of bypassing a vehicle immobilizer using a learning module in accordance with an embodiment of the present invention.

FIG. 27 shows a method to generate a securing device bypass 500 from key data reading 3004 by the external module 30 first, and then a key data reading 3006 by the learning module 80. In some instances, the learning module 80 may require information regarding the previously gathered key data reading or from the server 70.

Figure 28:
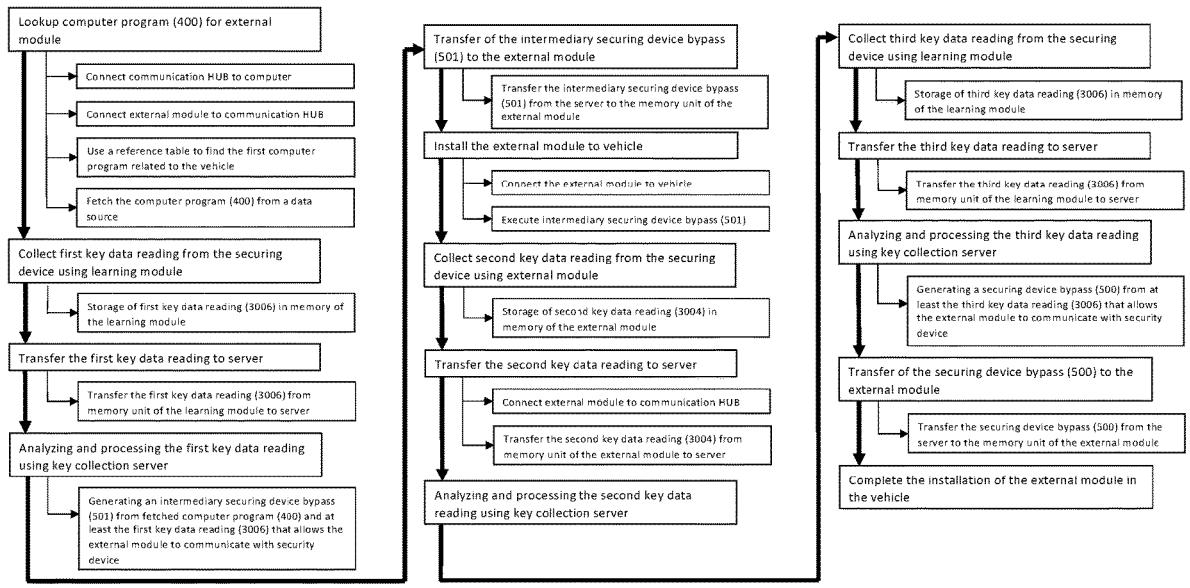
FIG. 28 depicts a flowchart showing the process of bypassing a vehicle immobilizer using a learning module in accordance with an embodiment of the present invention.

FIG. 28 shows a method to generate a securing device bypass 500 from a key data reading 3006 by learning module 80 first, then from key data reading 3004 by the external module 30, and then a key data reading 3006 by learning module 80 again. In some instances, the learning module 80 may require information regarding the previously gathered key data reading or from the server 70.

Figure 29:
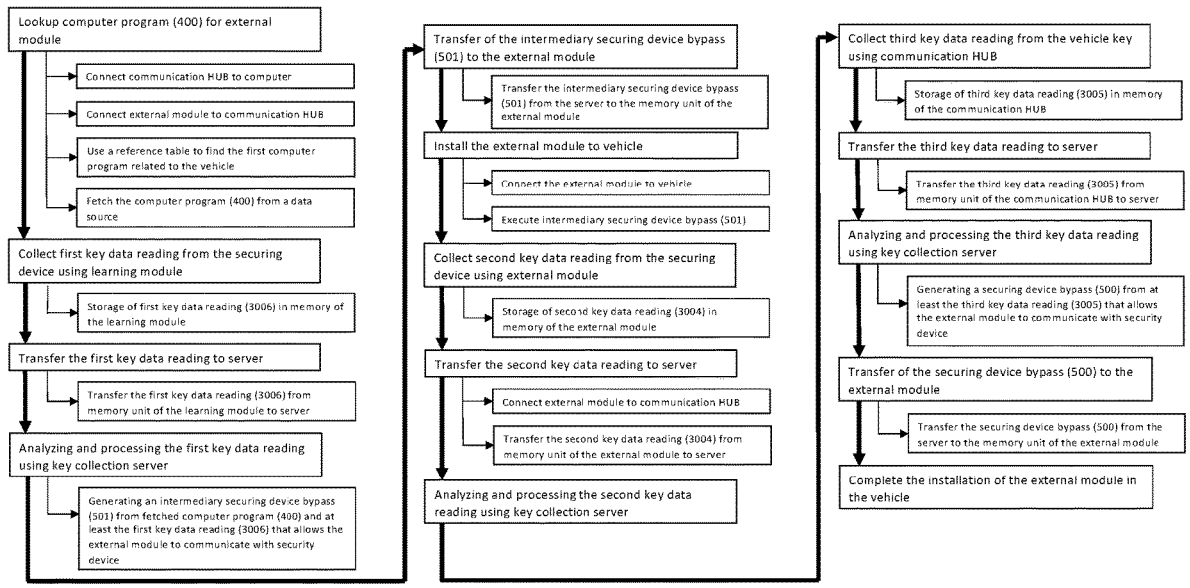
FIG. 29 depicts a flowchart showing the process of bypassing a vehicle immobilizer using a learning module in accordance with an embodiment of the present invention.

FIG. 29 shows a method to generate a securing device bypass 500 from a key data reading 3006 by the learning module 80 first, then a key data reading 3004 by the external module 30, and then a key data reading 3005 of vehicle key 40. In some instances, the communication hub 10 may require information regarding the previously gathered key data reading or from the server 70. Additionally, the learning module 80 may require information from the server 70.

Figure 30:
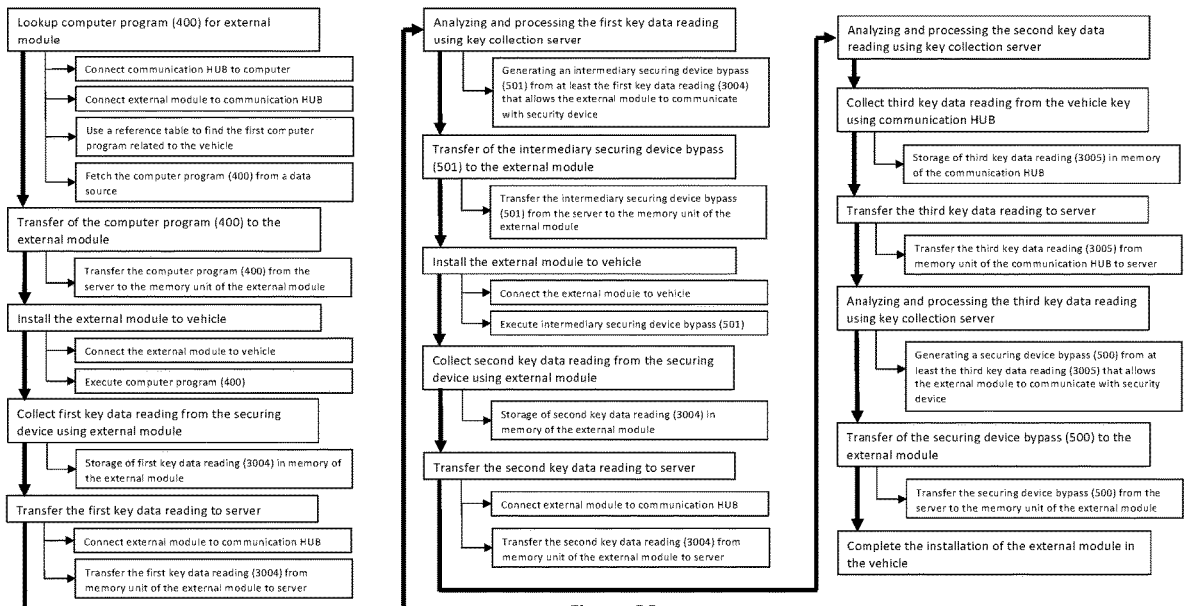
FIG. 30 depicts a flowchart showing the process of bypassing a vehicle immobilizer in accordance with an embodiment of the present invention.

FIG. 30 shows a method to generate a securing device bypass 500 from key data reading 3004 by the external module 30 first, then from key data reading 3004 from external module 30, and then a key data reading 3005 from the vehicle key 40. In some instances, the communication hub 10 may require information regarding the previously gathered key data reading or from the server 70.

More particularly, FIG. 30 shows that the steps generally comprise of connecting the communication hub 10 to computer 20. The communication hub 10 is then connected to an external module 30. The user will then access the server 70, to select the correct computer program 400 for the external module 30 that corresponds to the make and model of the vehicle 3 into which the external module 30 will be installed.

After the transfer, the external module 30 is disconnected from the communication hub 10 and reinstalled in the vehicle 3, at which point the module is instructed to collect key data reading 3004 from the vehicle 3. This procedure generally comprises the steps of connecting the external module 30 to a vehicle 3 and to execute the computer program 400. One skilled in the art will recognize that the specific connection method may vary for different vehicles from one manufacturer to the another and even from a particular vehicle model to another. The execution of the computer program 400 on the external module 30 allows the collection of a key data reading 3004 from a device securing the immobilizer system 301 and the acquiring and storage of the key data in a memory unit 35 of the external module 30.

After the collection of the key data reading 3004, the external module 30 is reconnected to the communication hub 10 and computer 20, and the key data reading 3004 may then be transferred to a computer 20 by using a computer network transfer protocol such as TCP/IP, wireless signal, such as Wi-Fi, or a communication cable, such as a USB or Firewire™ cable. The key data reading 3004 in turn is transferred to the server 70.

Upon transferring the key data reading 3004, the server 70 analyzes and processes the key data readings 3004 in the key collection server 71 to generate an intermediary securing device bypass 501. In the embodiment of this method, the external module 30 is reinstalled in the vehicle 3 and the above process is repeated a second time such that a second key data reading 3004 is collected from the vehicle 3 when the intermediary bypass 501 is executed.

Using the key data readings 3004 (first and second) and the information are then sent to the server 70. The server 70 may then require the communication hub 10 to communicate with the vehicle key 40 corresponding to the vehicle 3. To facilitate the communication, the user may insert the vehicle key 40 into a RFID communication device 114 of the communication hub 10.

When the vehicle key 40 is inserted, the server 70 may request computer 20 to collect key data reading 3005 from the vehicle key 40 and use the computer 20 to send the key data reading 3005 to the server 70. The key data reading 3005 when collected, may be stored in the memory 123 of the controller 120 of the communication hub 10.

The key data reading 3005 may then be transferred to a computer 20 by using a computer network transfer protocol such as TCP/IP, wireless signal, such as Wi-Fi, or a communication cable, such as a USB or Firewire™ cable. The key data reading 3005 in turn is transferred to the server 70.

Using the two key data readings 3004 (first and second) and 3005 and the information related to the manufacturer and/or model of the vehicle as input, key collection server can extrapolate the key data 3003 to generate a securing device bypass 500 that allows the external module to communicate with the securing device 301 of the vehicle 3. In another embodiment, it may be required to manually enter additional information, such as an identification number, a serial number or any unique identification information, to allow the server 70 to generate securing device bypass 500.

The securing device bypass 500 is then transferred back to the external module 30, which comprises the steps electronically transfer the securing device bypass 500 from the server 70 to at least one memory unit 35 of the external module 30 using an electronic communication method such as using a computer network transfer protocol such as TCP/IP, wireless network or a communication cable, such as a USB or Firewire™ cable.

After the transfer, the external module 30 is disconnected from the communication hub 10 and reinstalled in the vehicle 3 and capable of bypassing the immobilizer system 301.

One skilled in the art would understand that the basic steps of transferring a computer program 400, such as a firmware or portable software, from a computer device to an external module 30, to install the external module 30 and/or learning module 80 into a vehicle 3, to collect the key data reading 3004, 3006 from a securing device 301 and/or collect a key data reading 3005 from a vehicle key 40, to transfer the key data readings 3004, 3005, 3006 to a computer 20, to analyze and process the key data readings 3004, 3005, 3006 with a server 70 to extrapolate the key data 3003 to generate a securing device bypass 500 allowing the external module 30 to communicate with the securing device 301 and to transfer the generated securing device bypass 500 to the external module 30. These steps can be performed in any order and repeated as necessary depending on the vehicle 3 in which the external module 30 is installed.

One skilled in the art will also know that the system and method can not only be implemented in a personal vehicle, but also for vehicle sharing programs like ZipCar™ and other analogous services. Normally a car sharing service would leave a vehicle key in the vehicle. The car-sharing service would then provide the user with a separate manner to unlock the vehicle, like a smartphone application, so the user can use the vehicle key to start the vehicle. However, this creates a security problem and such that the vehicle can be stolen easily. In those cases, the method and system described above can be used to override the vehicle security (such as the immobilizer) electronically without the need to leave the vehicle key in the vehicle. This method would also work for consumer to consumer car sharing services as well and could obviate the need to provide a key to a consumer.

Other applications for the system and method described above include linking the external module to a mobile phone to use a mobile phone as the means to start the vehicle.

Although the invention is described in terms of specific illustrative embodiments and methods above, it is to be understood that the embodiments and methods described herein are by way of example only and that the scope of the invention is not intended to be limited thereby.

We claim:

1. A system to remotely flash an external module, the system comprising:
   a. an external module installable in a secured location having at least one securing device with a transponder; wherein the external module further comprises at least one port and a wireless communication device;
   b. at least one server, wherein the at least one server is configured to:
      i. access a data source;
      ii. look up a computer program that is compatible with the external module and securing device;
      iii. access a key extraction server configured to extract a key from key data;
   c. a communication hub that communicates with said at least one server, said communication hub further comprising a communication device that extracts key data from the securing device's transponder, a module port, and a wireless communication device;
   d. a first communication method facilitating a connection between the external module and the securing device utilizing said port;
   e. a second communication method utilizing said wireless communication device facilitating a connection between the communication device and the securing device's transponder without contact;
   f. a third communication method utilizing said wireless communication device between said communication hub and said external module without contact.

2. The system of claim 1, wherein said first communication method utilizes said wireless communication device without contact and said third communication methods utilizes said module port instead of said wireless communication device.

3. The system of claim 2, wherein said third communication method uses a computing device as an intermediary between said communication hub and said server such that said communication hub is connected to said computing device and said computing device is connected to said at least one server.

4. The system of claim 3, wherein said computing device is a smartphone.

5. The system of claim 4, wherein the secured location is a motor vehicle.

6. A method to remotely flash an external module, the method comprising:
   a. Connecting a communication hub to a server;
   b. Connecting the communication hub to an external module and a communication device;
   c. extracting at least one set of partial key data from a transponder for a securing device for a secured location using the communication device;
   d. transferring said set of partial key data extracted with the communication device to server;
   e. where a key extraction on the server analyzes and processes said sets of partial key data extracted with the communication device to generate a securing device bypass and transferring said securing device bypass to the external module; and,
   f. installing the external module to the secured location.

7. The method to remotely flash an external module of claim 6, the method further comprising:
   a. connecting the external module to said secured location with the securing device to access said securing device;
   b. extracting of a second set of partial key data from the securing device with the external module;
   c. transferring said second set of partial key data extracted with the external module to the server;
   d. the server analyzes and processes the first and second sets of partial key data extracted with the communication device and the external module to generate a securing device bypass and transfers said securing device bypass to the external module.

8. The method of claim 7, wherein the flashed external module unlocks the secured location without the presence of the transponder.

9. The method of claim 8, wherein the secured location is motor vehicle and the flashed external module starts the motor vehicle's engine.

10. The method of claim 7, wherein to connect said communication hub to said server, the communication hub is first connected to a computing device and the computing device is then connected to the server, thereby facilitating a connection between the communication hub and the server.

11. The method of claim 10, wherein a computer program must be transferred from a the server to the external module through the communication hub before the extraction of any sets of partial key data can take place.

* * * * *